US010692263B2

(12) United States Patent
Heo et al.

(10) Patent No.: US 10,692,263 B2
(45) Date of Patent: Jun. 23, 2020

(54) TERMINAL AND METHOD FOR CAUSING DISPLAY OF A COLLAGE WALLPAPER

(71) Applicant: LG ELECTRONICS INC., Seoul (KR)

(72) Inventors: Jeongyun Heo, Seoul (KR); Shinhae Lee, Seoul (KR); Hyungtae Jang, Seoul (KR); Jumin Chi, Seoul (KR); Jaeyoung Chae, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 24 days.

(21) Appl. No.: 15/901,789

(22) Filed: Feb. 21, 2018

(65) Prior Publication Data
US 2018/0247440 A1 Aug. 30, 2018

(30) Foreign Application Priority Data
Feb. 24, 2017 (KR) .................. 10-2017-0024714

(51) Int. Cl.
G06T 11/60 (2006.01)
G06T 11/00 (2006.01)
G09G 5/14 (2006.01)

(52) U.S. Cl.
CPC ............ G06T 11/60 (2013.01); G06T 11/001 (2013.01); G09G 5/14 (2013.01); G06T 2200/24 (2013.01); G09G 2354/00 (2013.01); G09G 2370/10 (2013.01); G09G 2370/16 (2013.01)

(58) Field of Classification Search
None
See application file for complete search history.

(56) References Cited

U.S. PATENT DOCUMENTS

| 5,140,348 | A | * | 8/1992 | Jamzadeh | G03G 15/01 347/115 |
| 2003/0067395 | A1 | * | 4/2003 | Hall | G08B 5/224 340/691.6 |
| 2005/0209923 | A1 | * | 9/2005 | Jablonski | G06Q 30/02 705/14.51 |
| 2007/0074110 | A1 | * | 3/2007 | Miksovsky | G06T 11/60 715/210 |
| 2010/0302595 | A1 | * | 12/2010 | Yamada | G06K 9/4642 358/1.18 |
| 2011/0119610 | A1 | * | 5/2011 | Hackborn | G06F 3/0481 715/768 |
| 2012/0162266 | A1 | * | 6/2012 | Douglas | G06F 3/0481 345/677 |
| 2013/0155069 | A1 | * | 6/2013 | Borders | G06T 11/20 345/441 |

(Continued)

Primary Examiner — Kee M Tung
Assistant Examiner — Patrick F Valdez
(74) Attorney, Agent, or Firm — Lee Hong Degerman Kang & Waimey

(57) ABSTRACT

The present invention relates to a terminal and a method of operating therefor. A terminal obtains an input for selecting at least one image, generates at least one collage wallpaper including a color area displaying at least a partial area of the entire area with single color and an image area displaying the at least one selected image on the remaining area of the entire area, and generates a collage wallpaper set including the generated at least one collage wallpaper. The terminal can display the at least one collage wallpaper included in the generated collage wallpaper set.

17 Claims, 40 Drawing Sheets

(56) References Cited

U.S. PATENT DOCUMENTS

| | | | |
|---|---|---|---|
| 2013/0332856 A1* | 12/2013 | Sanders | G06F 16/176 |
| | | | 715/753 |
| 2014/0165007 A1* | 6/2014 | Heo | G06F 3/0488 |
| | | | 715/835 |
| 2015/0334219 A1* | 11/2015 | Soundararajan | H04M 1/67 |
| | | | 455/414.1 |
| 2016/0267634 A1* | 9/2016 | Nam | G06T 11/60 |
| 2016/0357406 A1* | 12/2016 | Lee | G06T 11/60 |

* cited by examiner

FIG. 15
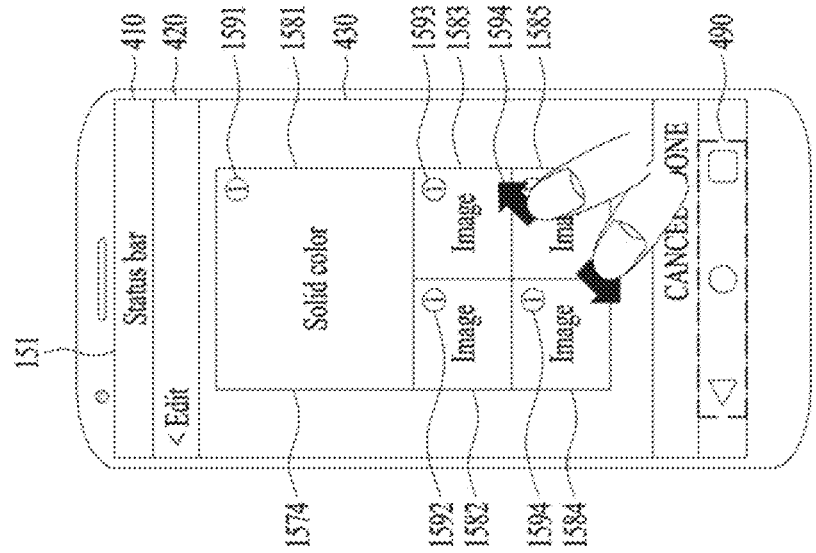
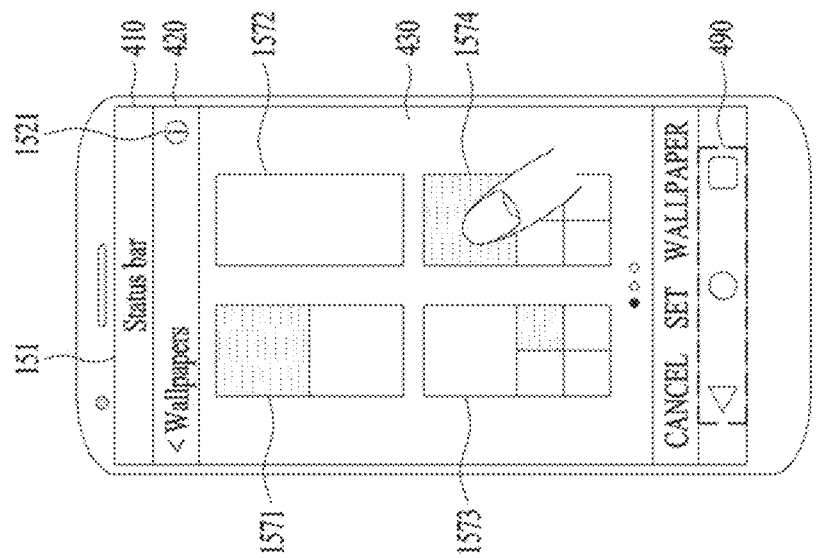

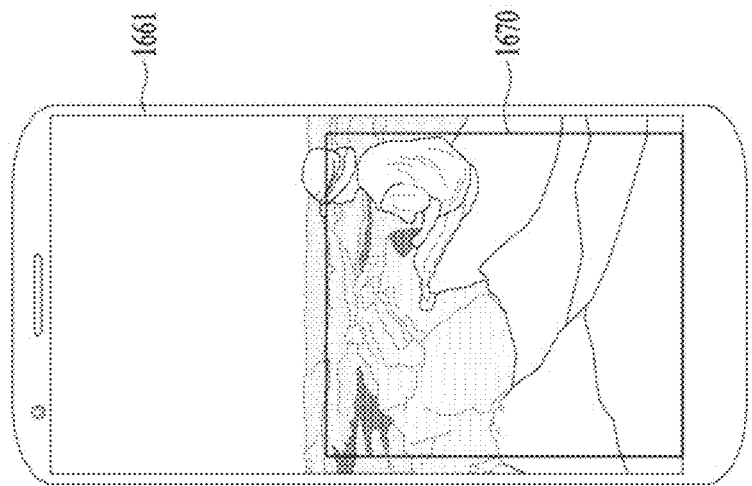
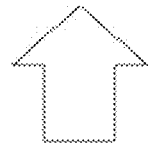
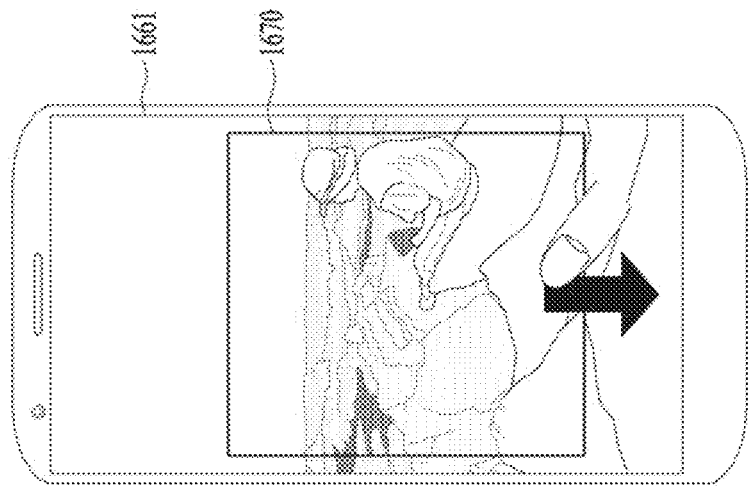
FIG. 16

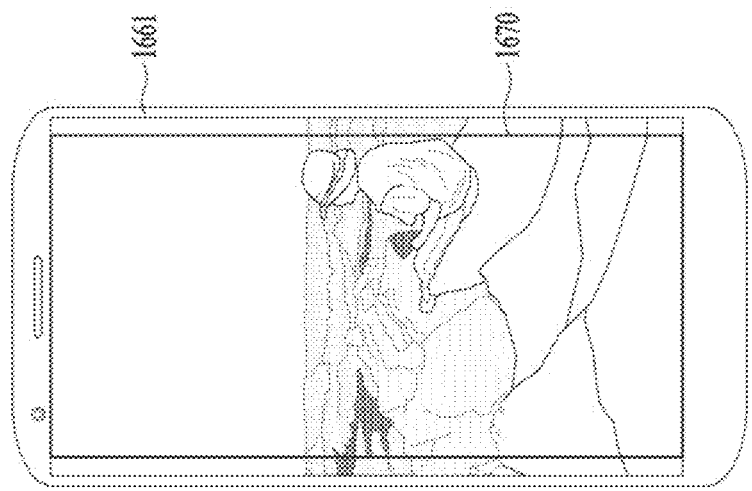
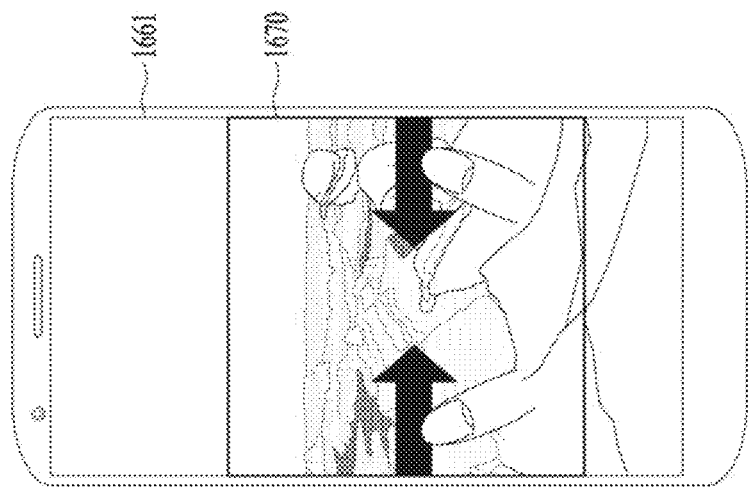
FIG. 17

FIG. 23

| | Layout A | Layout B | Layout C | Layout D | Layout E |
|---|---|---|---|---|---|
| | Full size | Solid color + ½ | ½ + ½ | ½ + ½*3 + Solid color | Solid color + ½*4 |
| | N | N | 2 (if N ≥ 2) | 1 (if N ≥ 4) | 1 (if N ≥ 4) |
| Image selected 1 | 1 | 1 | | | |
| Image selected 2 | 2 | 2 | 2 | | |
| Image selected 3 | 3 | 3 | 2 | | |
| Image selected 4 | 4 | 4 | 2 | 1 | 1 |

FIG. 24

| | Wallpaper preview layout order |
|---|---|
| 1 Image selected | B → A |
| 2 Image selected | B → C → A → B → C → A |
| 3 Image selected | B → C → A → B → C → A → B → A |
| 4 Image selected | B → C → A → B → C → A → B → A → B → A → D → E |

FIG. 27
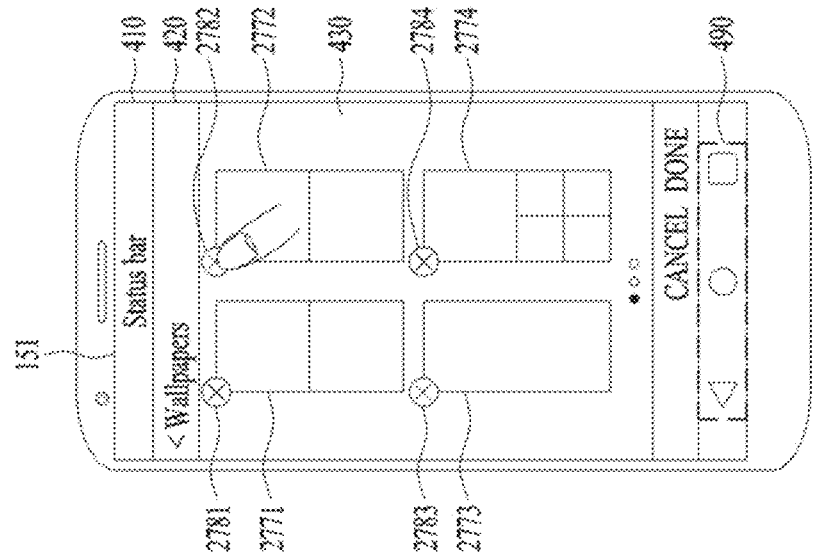
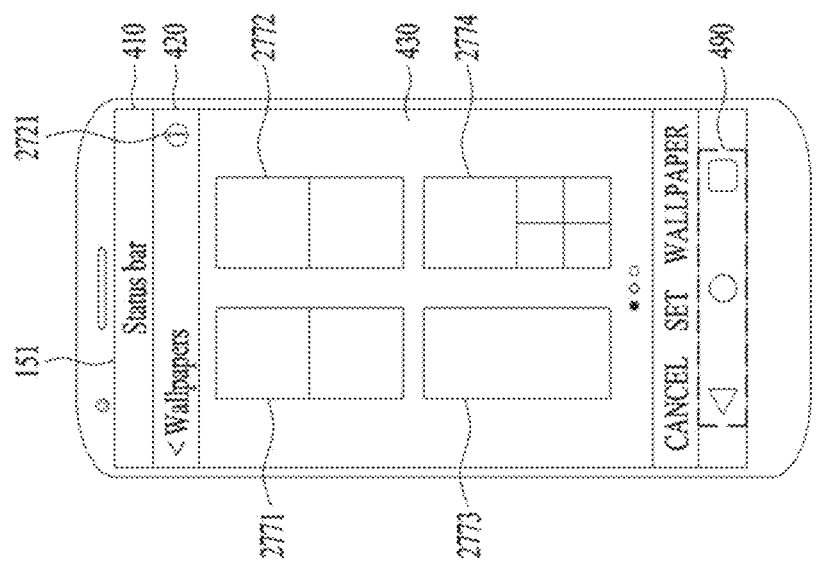

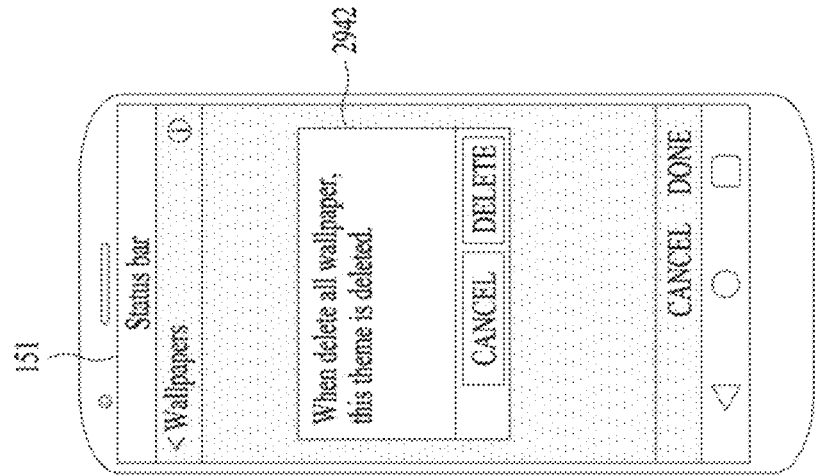
FIG. 29
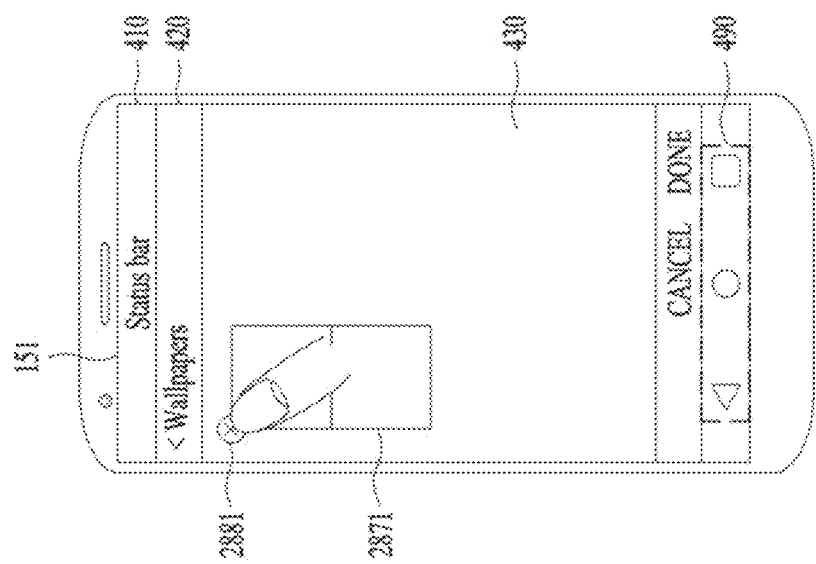

TERMINAL AND METHOD FOR CAUSING DISPLAY OF A COLLAGE WALLPAPER

Pursuant to 35 U.S.C. § 119(a), this application claims the benefit of earlier filing date and right of priority to Korean Patent Application No. 10-2017-0024714, filed on Feb. 24, 2017, the contents of which are hereby incorporated by reference herein in their entirety.

BACKGROUND OF THE INVENTION

Field of the Invention

The present invention relates to a terminal and a method of controlling therefor. More particularly, the present invention relates to a terminal providing various wallpapers and a method of controlling therefor.

Discussion of the Related Art

Terminals may be generally classified as mobile/portable terminals or stationary terminals according to their mobility. Mobile terminals may also be classified as handheld terminals or vehicle mounted terminals according to whether or not a user can directly carry the terminal.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

Efforts are ongoing to support and increase the functionality of mobile terminals. Such efforts include software and hardware improvements, as well as changes and improvements in the structural components.

Meanwhile, a terminal can displays a wallpaper according to an operation. For example, the terminal displays a wallpaper on a lock screen, a home screen, and the like.

Since the wallpaper corresponds to a screen frequently watched by a user on a display of the terminal, the user sets an image or a picture preferred by the user as the wallpaper and changes the wallpaper periodically.

However, although performance and functions of a terminal have been evolved, it is still necessary for a user to select and modify every setting and change of a wallpaper. In particular, setting and modifying the wallpaper of the terminal are still quite cumbersome actions.

SUMMARY OF THE INVENTION

Accordingly, the present invention is directed to an apparatus and method thereof that substantially obviate one or more problems due to limitations and disadvantages of the related art.

An object of the present invention is to provide a terminal capable of setting a wallpaper of various forms of the terminal and displaying the wallpaper in a manner of modifying the wallpaper according to a modification period and a method of operating the terminal according to various embodiments of the present invention.

Another object of the present invention is to generate a wallpaper of a collage form using selected images and display the generated wallpaper of the collage form.

The other object of the present invention is to provide an intuitive user interface for wallpaper generation and display setting.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, according to one embodiment, a terminal includes a display unit, a memory, and a controller configured to obtain an input for selecting at least one image, the controller configured to generate at least one collage wallpaper including a color area displaying at least a partial area of the entire area with single color and an image area displaying the at least one selected image on the remaining area of the entire area, the controller configured to generate a collage wallpaper set including the generated at least one collage wallpaper, the controller configured to display the at least one collage wallpaper included in the generated collage wallpaper set on the display unit.

The controller senses event occurrence and can display event information on the sensed event occurrence on the color area of the displayed collage wallpaper.

The controller can display the color area with a color corresponding to an application corresponding to the event information.

If an input inputted on the color area is obtained, the controller can display an application screen corresponding to the event information on the display unit.

The controller selects a color to be displayed on the color area based on share of colors included in an image displayed on the image area and can display the selected color on the color area.

The controller can generate a plurality of collage wallpapers having a predetermined layout according to the number of images selected by the obtained input.

The controller determines whether or not a modification period for modifying the displayed collage wallpaper arrives based on at least one of a display attribute of the displayed collage wallpaper and an operation status of the terminal. If the modification period arrives, the controller can display a different collage wallpaper included in the collage wallpaper set on the display unit.

The display attribute includes at least one selected from the group consisting of display timing, display time, and display count of the displayed collage wallpaper and the operation status of the terminal can include a turn-on status of the display unit of the terminal and a display status of the collage wallpaper of the display unit.

The controller can determine whether or not the modification period for modifying the displayed collage wallpaper arrives based on time elapsed from a first timing at which the displayed collage wallpaper is firstly displayed or a second timing at which the displayed collage wallpaper is lastly displayed in a single cycle for which a plurality of the collage wallpapers included in the collage wallpaper set are displayed.

The controller can display the different collage wallpaper according to an order configured based on a layout set to each of a plurality of collage wallpapers included in the collage wallpaper set.

To further achieve these objects and other advantages and in accordance with the purpose of the invention, as embodied and broadly described herein, according to a different embodiment, a method of operating a terminal includes the steps of obtaining an input for selecting at least one image, generating at least one collage wallpaper including a color area displaying at least a partial area of the entire area with single color and an image area displaying the at least one selected image on the remaining area of the entire area, generating a collage wallpaper set including the generated at least one collage wallpaper, and displaying the at least one collage wallpaper included in the generated collage wallpaper set.

The method can further include the steps of sensing event occurrence, and displaying event information on the sensed event occurrence on the color area of the displayed collage wallpaper.

The step of displaying the event information on the sensed event occurrence on the color area of the displayed collage wallpaper can include the step of displaying the color area with a color corresponding to an application corresponding to the event information.

If an input inputted on the color area is obtained, the method can further include the step of displaying an application screen corresponding to the event information.

The collage wallpaper generating step can include the steps of selecting a color to be displayed on the color area based on share of colors included in an image displayed on the image area, and displaying the selected color on the color area.

The collage wallpaper generating step can include the step of generating a plurality of collage wallpapers having a predetermined layout according to the number of images selected by the obtained input.

The method can further include the steps of determining whether or not a modification period for modifying the displayed collage wallpaper arrives based on at least one of a display attribute of the displayed collage wallpaper and an operation status of the terminal, and if the modification period arrives, displaying a different collage wallpaper included in the collage wallpaper set.

The display attribute includes at least one selected from the group consisting of display timing, display time, and display count of the displayed collage wallpaper and the operation status of the terminal can include a turn-on status of the display unit of the terminal and a display status of the collage wallpaper of the display unit.

The step of determining the modification period can include the step of determining whether or not the modification period for modifying the displayed collage wallpaper arrives based on time elapsed from a first timing at which the displayed collage wallpaper is firstly displayed or a second timing at which the displayed collage wallpaper is lastly displayed in a single cycle for which a plurality of the collage wallpapers included in the collage wallpaper set are displayed.

The step of displaying the different collage wallpaper can include the step of displaying the different collage wallpaper according to an order configured based on a layout set to each of a plurality of collage wallpapers included in the collage wallpaper set.

According to embodiments of the present invention, since a terminal is able to set a wallpaper of various forms and display the wallpaper in a manner of modifying the wallpaper according to a modification period, it is able to enhance user satisfaction in displaying the wallpaper.

According to the present invention, since it is able to generate and display a wallpaper of a collage form using images selected by a user, it is able to provide a wallpaper of various forms.

According to the present invention, it is able to provide an intuitive user interface for wallpaper generation and display setting.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 15 is a diagram for an example of editing an image of a collage wallpaper according to various embodiments of the present invention;

FIG. 16 is a diagram for an example of editing an image area according to various embodiments of the present invention;

FIG. 17 is a diagram for an example of editing an image display proportion according to various embodiments of the present invention;

FIG. 23 is a diagram for layouts applied to a collage wallpaper according to various embodiments of the present invention;

FIG. 24 is a diagram for a display order of a layout applied to a collage wallpaper according to various embodiments of the present invention;

FIG. 27 is a diagram for an editing screen of a collage wallpaper according to various embodiments of the present invention;

FIGS. 28 to 29 are diagrams for a delete confirmation message according to various embodiments of the present invention;

DETAILED DESCRIPTION OF THE INVENTION

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1A:
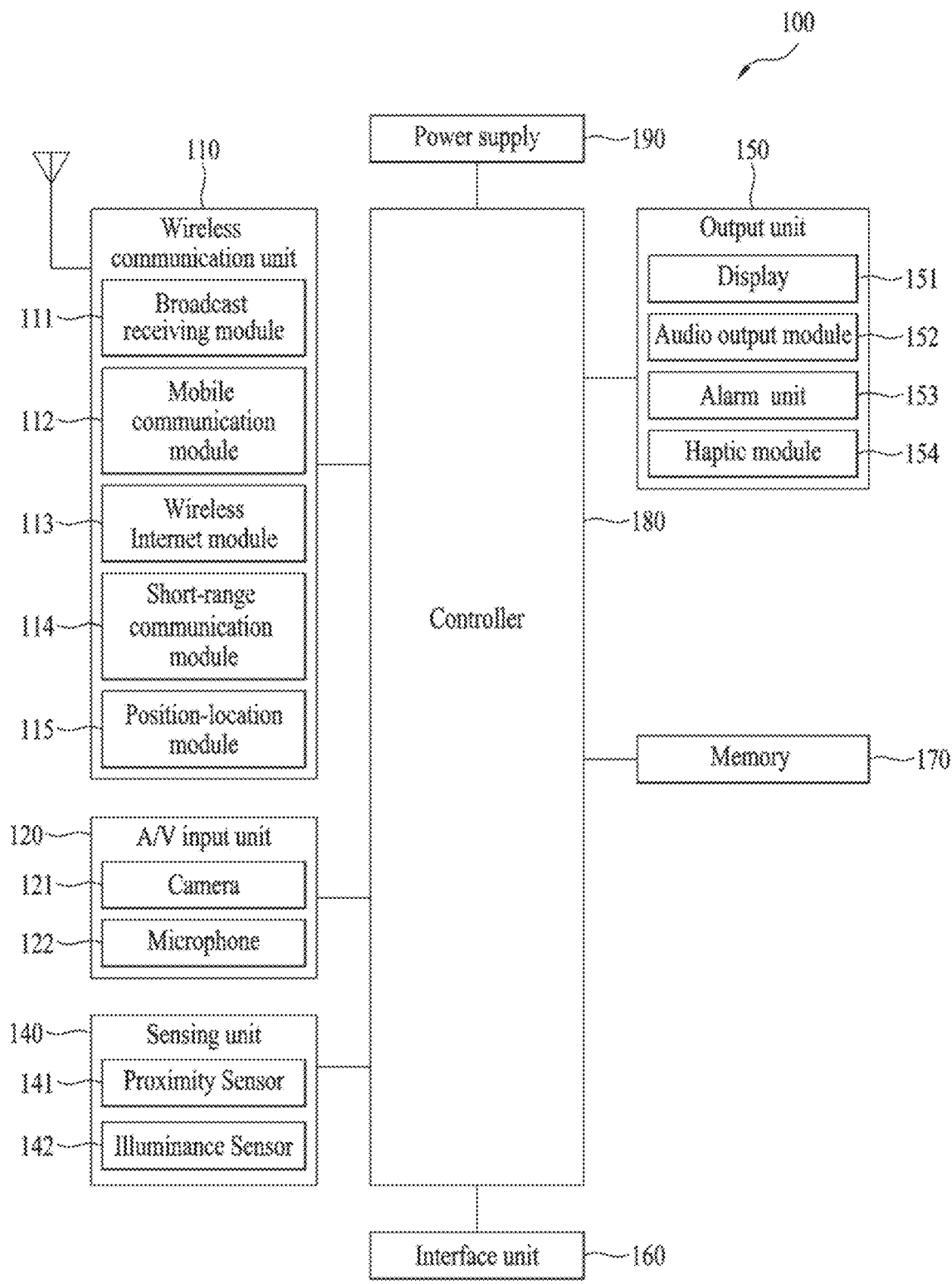
FIG. 1A is a block diagram to describe a terminal related to the present invention.
Figure 1B:
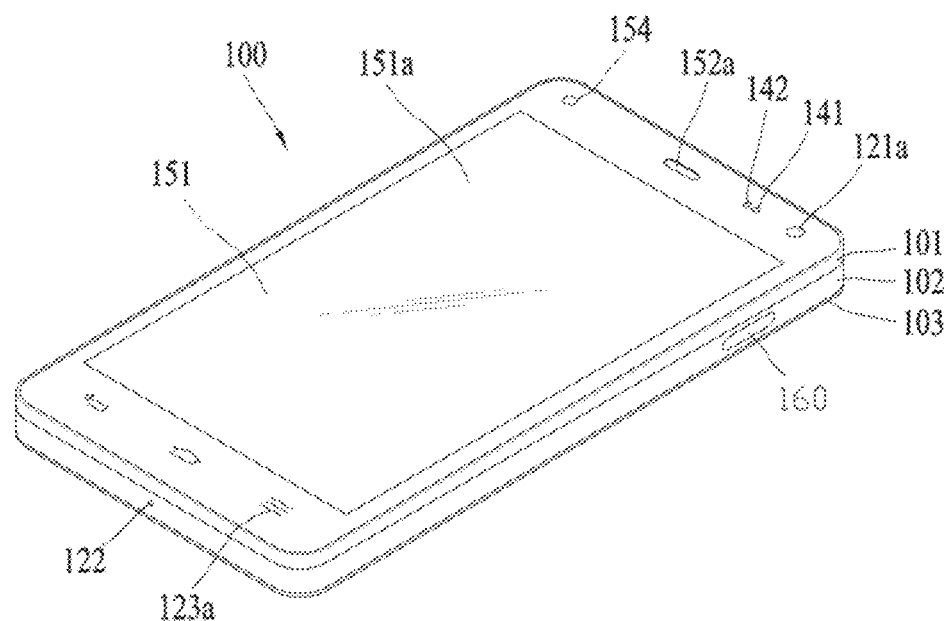
FIG. 1B and FIG. 1C are diagrams for the concept of one example of a terminal related to the present invention in different views, respectively.
Figure 1C:
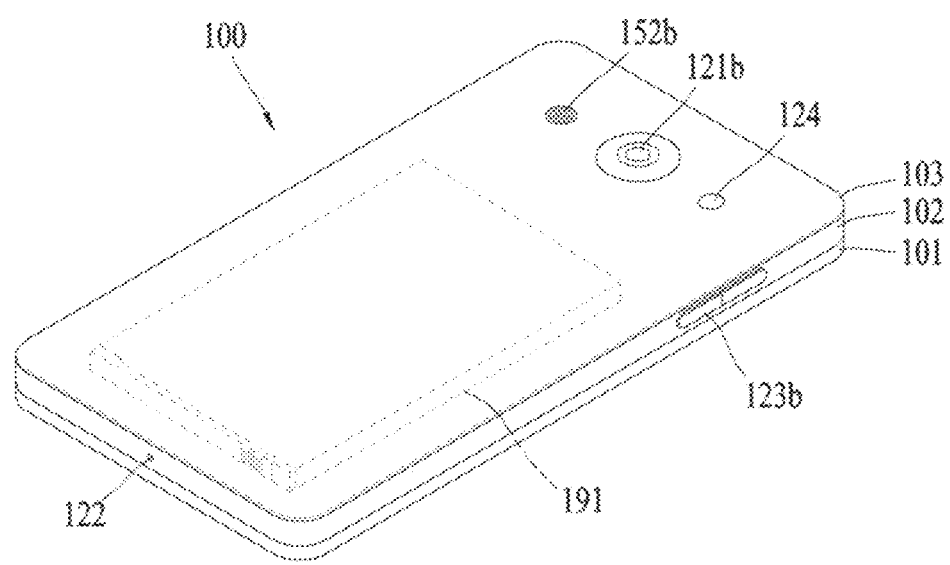

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

Referring now to FIG. 1A, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142.

If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the various components depicted in FIG. 1A, or activating application programs stored in the memory 170. As one example, the controller 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Referring still to FIG. 1A, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The broadcast managing entity may be implemented using a server or system which generates and transmits a broadcast signal and/or broadcast associated information, or a server which receives a pre-generated broadcast signal and/or broadcast associated information, and sends such items to the mobile terminal. The broadcast signal may be implemented using any of a TV broadcast signal, a radio broadcast signal, a data broadcast signal, and combinations thereof, among others. The broadcast signal in some cases may further include a data broadcast signal combined with a TV or radio broadcast signal.

The broadcast signal may be encoded according to any of a variety of technical standards or broadcasting methods (for example, International Organization for Standardization (ISO), International Electrotechnical Commission (IEC), Digital Video Broadcast (DVB), Advanced Television Systems Committee (ATSC), and the like) for transmission and reception of digital broadcast signals. The broadcast receiving module 111 can receive the digital broadcast signals using a method appropriate for the transmission method utilized.

Examples of broadcast associated information may include information associated with a broadcast channel, a broadcast program, a broadcast event, a broadcast service provider, or the like. The broadcast associated information may also be provided via a mobile communication network, and in this case, received by the mobile communication module 112.

The broadcast associated information may be implemented in various formats. For instance, broadcast associated information may include an Electronic Program Guide (EPG) of Digital Multimedia Broadcasting (DMB), an Electronic Service Guide (ESG) of Digital Video Broadcast-Handheld (DVB-H), and the like. Broadcast signals and/or broadcast associated information received via the broadcast receiving module 111 may be stored in a suitable device, such as a memory 170.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like). Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

In general, a 3D stereoscopic image may include a left image (e.g., a left eye image) and a right image (e.g., a right eye image). According to how left and right images are combined into a 3D stereoscopic image, a 3D stereoscopic imaging method can be divided into a top-down method in which left and right images are located up and down in a frame, an L-to-R (left-to-right or side by side) method in which left and right images are located left and right in a frame, a checker board method in which fragments of left and right images are located in a tile form, an interlaced method in which left and right images are alternately located by columns or rows, and a time sequential (or frame by frame) method in which left and right images are alternately displayed on a time basis.

Also, as for a 3D thumbnail image, a left image thumbnail and a right image thumbnail can be generated from a left image and a right image of an original image frame, respectively, and then combined to generate a single 3D thumbnail image. In general, the term "thumbnail" may be used to refer to a reduced image or a reduced still image. A generated left image thumbnail and right image thumbnail may be displayed with a horizontal distance difference there between by a depth corresponding to the disparity between the left image and the right image on the screen, thereby providing a stereoscopic space sense.

A left image and a right image required for implementing a 3D stereoscopic image may be displayed on the stereoscopic display unit using a stereoscopic processing unit. The stereoscopic processing unit can receive the 3D image and extract the left image and the right image, or can receive the 2D image and change it into a left image and a right image.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.).

The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

FIGS. 1B and 1C depict certain components as arranged on the mobile terminal. However, it is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 1C, a flash 124 is shown adjacent to the second camera 121b. When an image of a subject is captured with the camera 121b, the flash 124 may illuminate the subject.

As shown in FIG. 1B, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

A terminal 100 according to various embodiments can generate and display various wallpapers on a display unit 151. The terminal 100 can modify the displayed wallpaper according to various modification conditions and display the modified wallpaper on the display unit 151. In this case, the wallpaper may correspond to an image displayed on a lock screen or a home screen of the terminal 100. Hence, the wallpaper may have an image form, a video form, or a form in which an image and a video are mixed. The modification condition may correspond to a modification period. Regarding this, it shall be explained in detail in the following.

Figure 2:
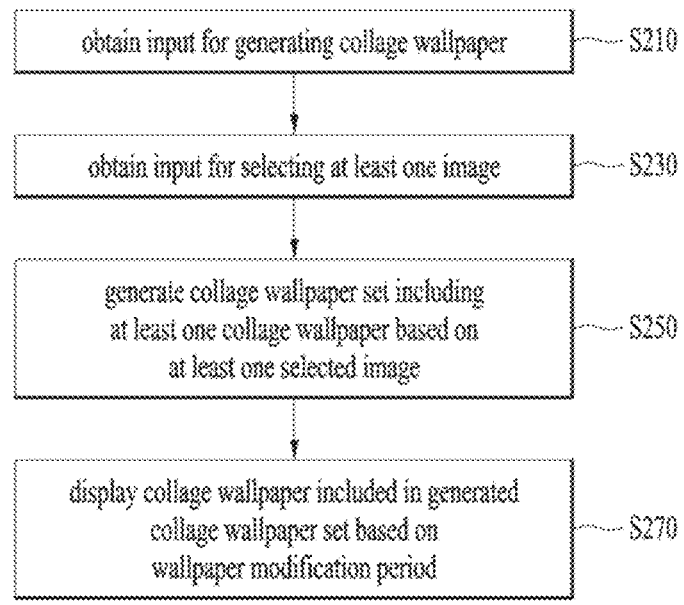
FIG. 2 is a flowchart for an operation method of a terminal according to various embodiments of the present invention.

FIG. 2 is a flowchart for an operation method of a terminal according to various embodiments of the present invention.

Referring to FIG. 2, the terminal 100 can obtain an input for generating a collage wallpaper [S210].

Having obtained the input for generating the collage wallpaper, the terminal 100 may operate in a collage wallpaper generation mode. For example, the controller 180 may enter a procedure for generating the collage wallpaper. By doing so, the terminal 100 can obtain a user input for generating a collage wallpaper and display a user interface for obtaining the user input for generating the collage wallpaper. In this case, the collage wallpaper may correspond to a wallpaper of various forms. For example, the collage wallpaper may correspond to an image to which a plurality of images are arranged in various layouts. Or, the collage wallpaper may correspond to an image that an image is displayed in a partial area of the image and a specific color and/or a pattern is displayed in a different area of the image. As a different example, the collage wallpaper may correspond to an image including a moving image in a part of the image. The collage wallpaper may correspond to an image including no movement or an image that at least a part of the collage wallpaper corresponds to a moving image.

The terminal 100 can obtain an input for selecting at least one image [S230].

For example, the controller 180 can obtain an input for selecting at least one image to be generated as a collage wallpaper in the collage wallpaper generation mode. The terminal 100 can receive selection of the predetermined number of images. As an embodiment, the terminal 100 can obtain a user input for selecting the predetermined number of images. Contents on image selection shall be described in detail later.

The terminal 100 can generate a collage wallpaper set including at least one collage wallpaper based on at least one selected image [S250].

For example, the controller 180 can generate a collage wallpaper using at least one selected image. The controller 180 can generate a collage wallpaper set including the at least one generated wallpaper. Hence, the collage wallpaper set can include a collage wallpaper which is generated based on a selected image. Hence, a collage wallpaper, which is generated using a selected image, can be included in the collage wallpaper set. The collage wallpaper generated by the terminal 100 can include at least one color area. In this case, the color area may correspond to an area on which at least one color is displayed or an area to which a specific pattern is applied. The terminal 100 can generate a collage wallpaper including the aforementioned color area and an image area on which a selected image is displayed. For example, the terminal 100 may generate a collage wallpaper including a color area only or a collage wallpaper including an image area on which a selected image is displayed only. And, the terminal 100 can generate a collage wallpaper including both the color area and the image area. As an embodiment, if the terminal 100 obtains an input for selecting 4 images, the terminal can generate 12 collage wallpapers based on the selected 4 images. The terminal 100 can generate a collage wallpaper set, i.e., one theme, using the generated 12 collage wallpapers.

Meanwhile, the terminal 100 can store the predetermined number of collage wallpaper sets. For example, the terminal 100 can store a single basic theme (default collage wallpaper set) and a plurality of themes (generated collage wallpaper sets) generated by a user.

As mentioned in the foregoing description, the terminal 100 can generate a plurality of collage wallpapers according to the number of selected images and generate a collage wallpaper set including the generated collage wallpapers.

The terminal 100 can display the collage wallpapers included in the generated collage wallpaper set on the display unit 151 based on a wallpaper modification period [S270].

The terminal 100 can display a collage wallpaper included in the generated collage wallpaper set as a wallpaper. For example, the controller 180 can display the generated collage wallpaper on a home screen or a lock screen.

If an image included in a collage wallpaper corresponds to a moving image, the terminal 100 can display a screen on which the image included in the collage wallpaper is moving according to an operation status of the terminal and a user input. For example, when the display unit 151 is turned on, the terminal 100 can display the screen on which the image included in the collage wallpaper is moving. As a different example, if a specific input such as a force touch or a swipe input is inputted, the terminal 100 can display the screen on which the image included in the collage wallpaper is moving.

The terminal 100 can modify a displayed wallpaper according to a wallpaper modification period. For example, when a wallpaper modification period arrives, the controller 180 can change a displayed collage wallpaper with a different collage wallpaper included in a collage wallpaper set. In this case, the wallpaper modification period may correspond to a wallpaper modification condition or a wallpaper modification condition according to a user configuration.

For example, the terminal 100 can determine a wallpaper modification period according to a display attribute of a displayed collage wallpaper and an operation status of the terminal. In this case, the display attribute of the displayed collage wallpaper can include display timing, display time, and display number of the displayed collage wallpaper. The operation status of the terminal can include turn-on status of the display unit 151 and a collage wallpaper display status of the display unit 151. If a wallpaper modification period arrives, the terminal 100 can display a different collage wallpaper rather than a previously displayed collage wallpaper.

Regarding this, it shall be described in detail with reference to FIG. 3 in the following.

Figure 3:
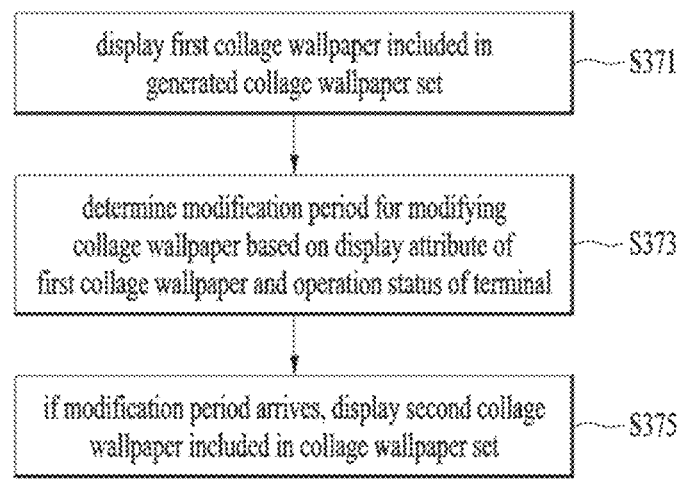
FIG. 3 is a flowchart for a modification operation of a collage wallpaper according to various embodiments of the present invention.

FIG. 3 is a flowchart for a modification operation of a collage wallpaper according to various embodiments of the present invention.

Referring to FIG. 3, the terminal 100 can display a first collage wallpaper included in a generated collage wallpaper set [S371].

For example, the controller 180 can display a collage wallpaper among collage wallpapers generated using selected images on the display unit 151.

The terminal 100 can determine a modification period for modifying a collage wallpaper based on a display attribute of the first collage wallpaper and an operation status of the terminal [S373].

In this case, the modification period determined by the terminal 100 can be used for determining whether or not a wallpaper displayed on the display unit 151 is changed to a different collage wallpaper included in the collage wallpaper set. If the terminal 100 determines that the modification period arrives, it is able to determine that the terminal changes the displayed collage wallpaper with the different collage wallpaper.

The controller 180 can determine whether to change the first collage wallpaper with a different collage wallpaper included in the collage wallpaper set based on various criteria.

For example, if time is elapsed more than reference time after the first collage wallpaper is displayed on the display unit 151, the controller 180 can determine it as the collage wallpaper modification period has arrived.

As a different example, if the number of displaying the first collage wallpaper on the display unit 151 is equal to or greater than a reference number, the controller 180 can determine it as the collage wallpaper modification period has arrived. In this case, the number of displaying the first collage wallpaper may correspond to the number of displaying the first collage wallpaper according to the turn-on of the display unit 151.

As a further different example, whenever the display unit 151 is turned on from a state of being turned off, the controller 180 can determine it as the collage wallpaper modification period has arrived.

And, the controller 180 can determine the collage wallpaper modification period by combining the aforementioned various references. For example, the controller 180 can determine the collage wallpaper modification period based on time elapsed from prescribed timing at which the first collage wallpaper is displayed on the display unit 151 and the number of displaying the first collage wallpaper on the display unit. As a different example, the controller 180 can determine the collage wallpaper modification period based on time elapsed from prescribed timing at which the first collage wallpaper is displayed on the display unit 151 and a turn-on operation of the display unit 151.

If the modification period arrives, the terminal 100 can display a second collage wallpaper included in the collage wallpaper set [S375].

For example, if it is determined as a modification period for changing the displayed first collage wallpaper with a different collage wallpaper has arrived, the controller 180 can display the second collage wallpaper corresponding to a different collage wallpaper, which is included in the same collage wallpaper set to which the first collage wallpaper belongs, on the display unit 151.

The terminal 100 also determines a modification period for the second collage wallpaper to change the second collage wallpaper with a different collage wallpaper included in the same collage wallpaper set.

The terminal 100 can display a plurality of collage wallpapers included in the collage wallpaper set in a manner of changing a plurality of the wallpapers. The terminal 100 can change a plurality of the collage wallpapers included in the collage wallpaper set according to a predetermined order. If all collage wallpapers included in the collage wallpaper set are displayed one time, it may be able to repeatedly display the collage wallpapers. Displaying the collage wallpapers included in the collage wallpaper set one time can be referred to as a cycle.

The aforementioned contents are explained in detail via a specific embodiment.

First of all, a collage wallpaper generated by the terminal 100 is explained with reference to FIGS. 4 to 5 in the following.

Figure 4:
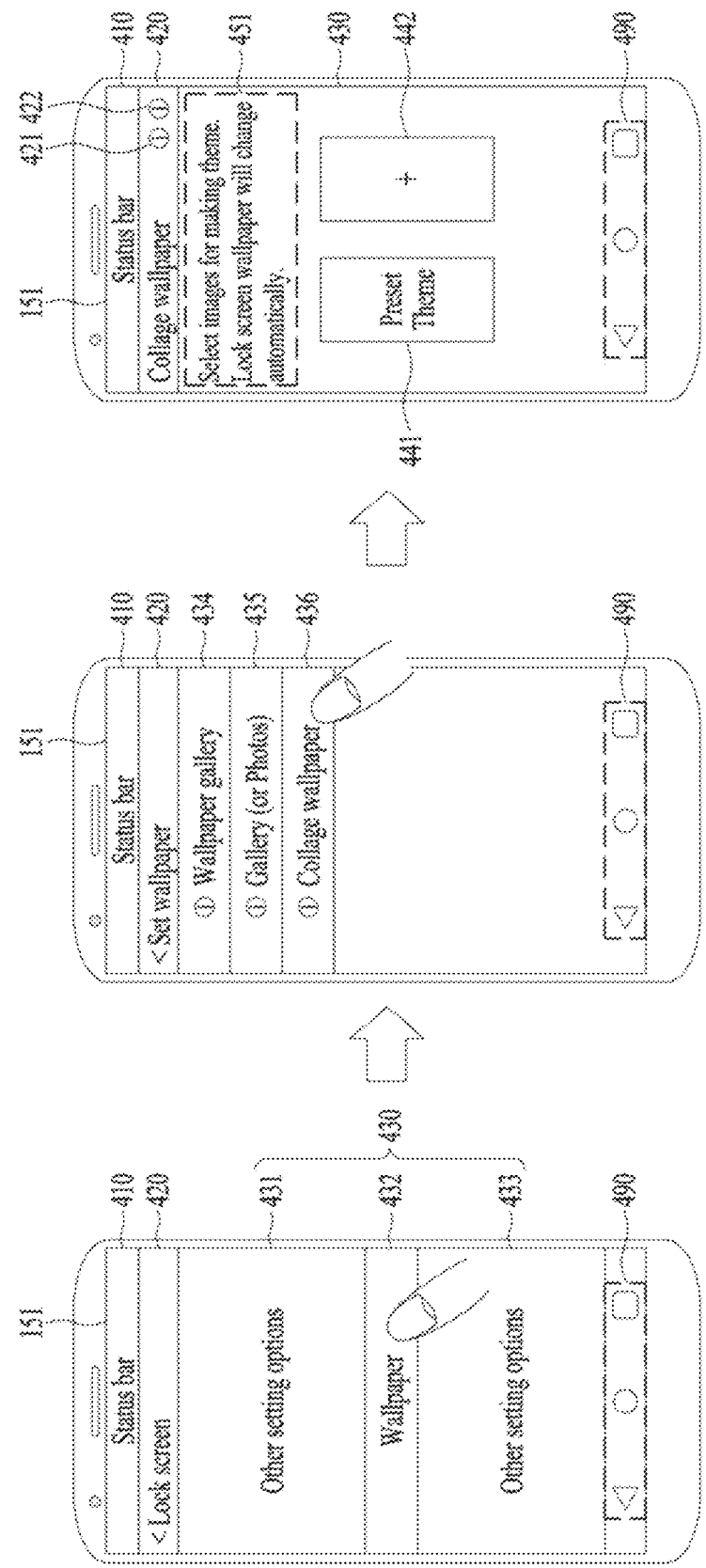
FIG. 4 is a diagram for an example of entering a collage wallpaper generation mode according to various embodiments of the present invention.

FIG. 4 is a diagram for an example of entering a collage wallpaper generation mode according to various embodiments of the present invention.

Figure 5:
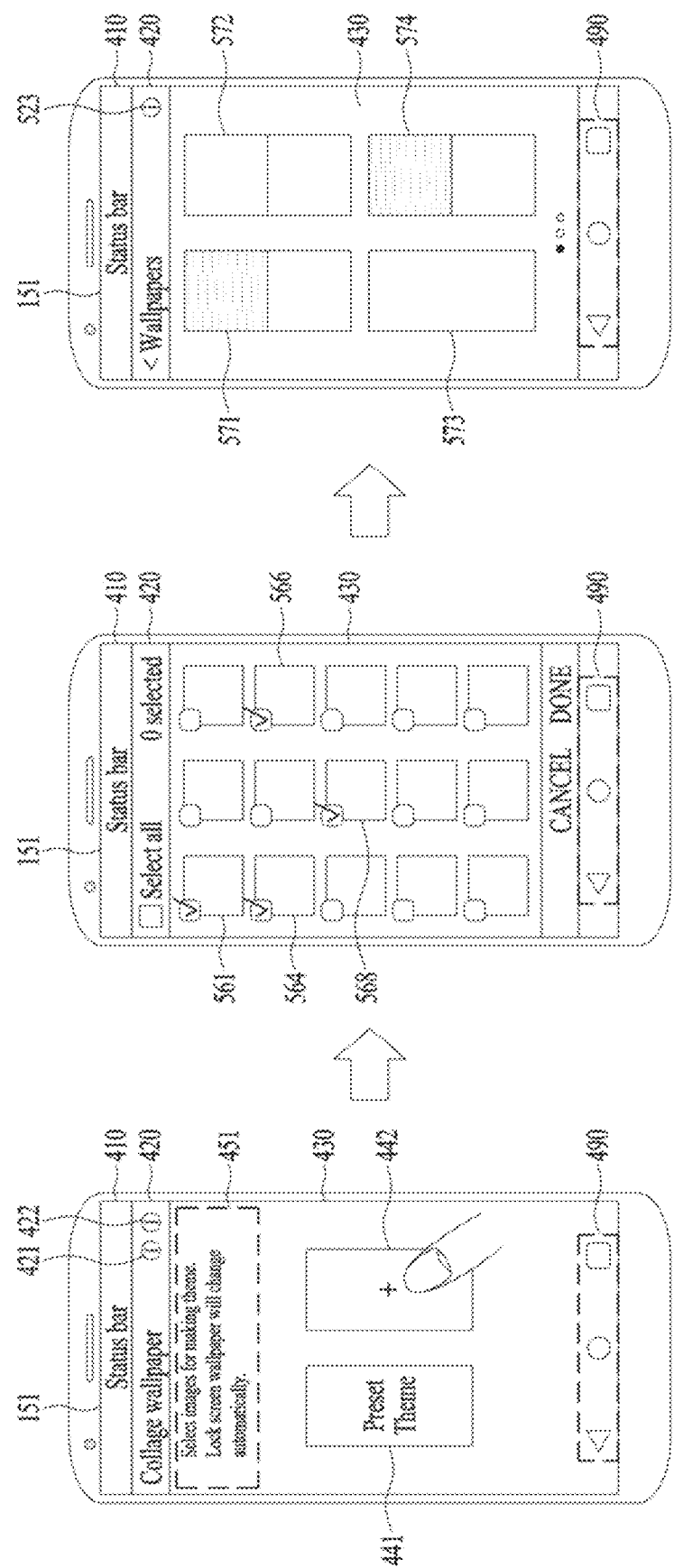
FIG. 5 is a diagram for an example of generating a collage wallpaper according to various embodiments of the present invention.

FIG. 5 is a diagram for an example of generating a collage wallpaper according to various embodiments of the present invention.

Referring to FIG. 4, the terminal 100 can display a menu 432 for configuring a wallpaper on the display unit 151. For example, the controller 180 can divide the display 151 into a status bar area 410, a title area 420, and a main area 430 and can display information, a menu, and the like corresponding to each of the areas.

As an embodiment, the controller 180 can display various informations related to an operation status of the terminal or an indicator on the status bar area 410. For example, the controller 180 can display information on a communication status, time, battery, an occurred event, and the like or an indicator on the status bar area 410. The controller 180 can display information related to a screen displayed on the main area 430, e.g., a title on the title area 420. For example, when a menu related to a lock screen is displayed on the main area 430, the controller 180 can display a title for the lock screen on the title area 420. The controller 180 can display menus 431/433 related to the lock screen on the main area 430 and can display a wallpaper menu 432 capable of setting a wallpaper. And, the controller 180 can display a navigation bar 490 including a home key, a backspace key, and a menu key at the bottom of the display unit 151.

If an input for selecting the wallpaper menu 432 is obtained, the controller 180 can display menus 434/435/436 related to wallpaper. For example, the controller 180 can display a wallpaper gallery menu 434, a gallery menu 435, and a collage wallpaper menu 436.

If an input for selecting the collage wallpaper menu 436 is obtained, the controller 180 can display a user interface capable of selecting and generating collage wallpaper on the display unit 151. For example, the controller 180 displays a collage wallpaper on the title area 420 and can display a first icon 421 and a second icon 422 corresponding to a relevance function. In this case, the first icon 421 and the second icon 422 corresponding to the relevant function may correspond to icons related to change, delete, and stage move of collage wallpaper. The controller 180 can display content 451 related to collage wallpaper setting on the main area 430 and display a default theme 441 and an add menu 442. In this case, the default theme 441 may correspond to an image corresponding to a collage wallpaper set configured as default.

Referring to FIG. 5, the controller 180 can obtain an input for selecting the add menu 442 and display a screen for selecting at least one image to be included in collage wallpaper. For example, the controller 180 can display a plurality of image thumbnails on the main area 430 and obtain an input for selecting at least one thumbnail from among the displayed thumbnails. The controller 180 can display a check indicator on the selected thumbnail among a plurality of the displayed thumbnails. For example, the controller 180 can respectively display a check indicator on a first image thumbnail 561, a fourth image thumbnail 564, a sixth image thumbnail 566, and an eighth image thumbnail 568 selected from among a plurality of the displayed thumbnails. The controller 180 can generate a collage wallpaper based on the first image, the fourth image, the sixth image, and the eighth image corresponding to the selected images. For example, the controller 180 generates a collage wallpaper in which at least one of the selected images is included and can display a first collage wallpaper 571, a second collage wallpaper 572, a third collage wallpaper 573, and a fourth collage wallpaper 574 corresponding to generated collage wallpapers on the main area 430. And, the controller 180 can also display a menu for configuring the generated collage wallpaper to be displayed, a menu for cancelling the generated collage wallpaper, and the like. In this case, the first to the fourth collage wallpaper 571-574 corresponding to the generated collage wallpapers can be included in a collage wallpaper set.

The generated collage wallpaper is explained with reference to FIGS. 6 to 7.

Figure 6:
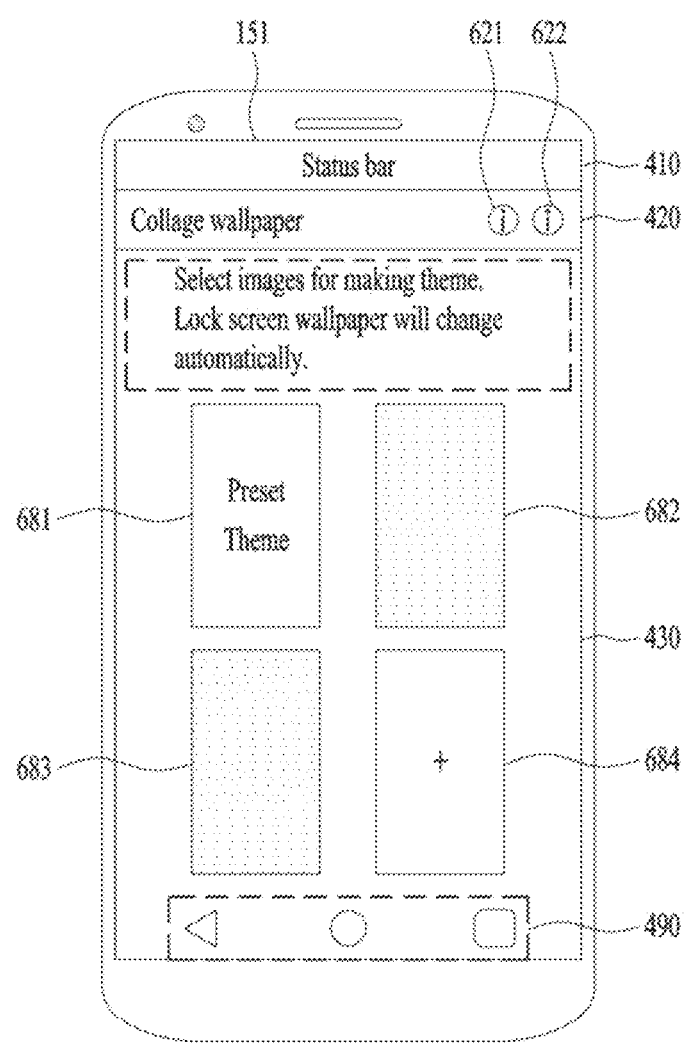
FIG. 6 is a diagram for an example of displaying a collage wallpaper set according to various embodiments of the present invention.

FIG. 6 is a diagram for an example of displaying a collage wallpaper set according to various embodiments of the present invention.

Referring to FIG. 6, the terminal 100 can display a plurality of collage wallpaper sets on the display unit 151. For example, the controller 180 displays a title for collage wallpaper on the title area 420 and can display a plurality of theme images 681/682/683 corresponding to a plurality of the collage wallpaper sets on the main area 430. In this case, the theme image 681/682/683 may correspond to representative collage wallpaper included in corresponding collage wallpaper set or an image edited from a plurality of the collage wallpapers included in corresponding collage wallpaper set. The controller 180 may display an add menu for adding a new collage wallpaper. The controller 180 can display icons 621/622 related to collage wallpaper on the title area 420. For example, the controller 180 can display an icon related to change, delete, and stage move of collage wallpaper set.

Figure 7:
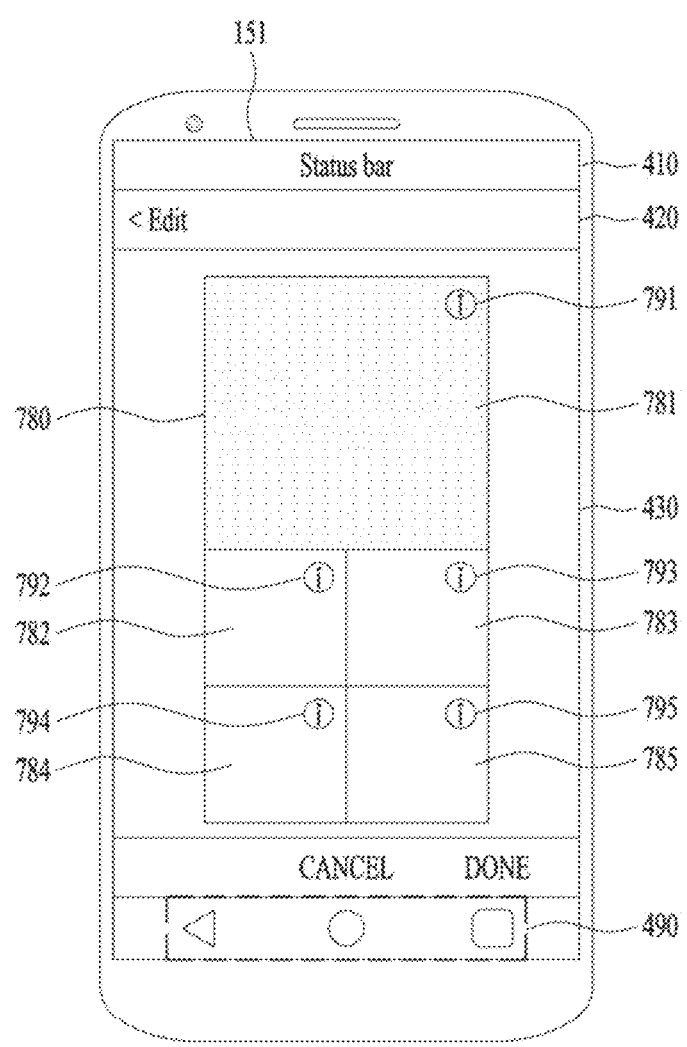
FIG. 7 is a diagram for an example of a collage wallpaper set according to various embodiments of the present invention.

FIG. 7 is a diagram for an example of a collage wallpaper set according to various embodiments of the present invention.

Referring to FIG. 7, the controller 180 can display a generated collage wallpaper 780 on the display unit 151. For example, the controller 180 can display the generated collage wallpaper 780 in an editing menu. As mentioned in the foregoing description, the controller 180 can generate a collage wallpaper including a color area and an image area. For example, the controller 180 can generate collage wallpaper 780 including a first area 781 in which one color is displayed and second area to fifth area 782-785 in which selected images are displayed, respectively. In this case, the number of areas included in the collage wallpaper may vary according to the number of images included in the collage wallpaper and a layout for arranging a plurality of areas can be applied in various ways. The controller 180 can configure a color displayed on the first area 781 based on images included in the second to the fifth area 782-785. For example, the controller 180 can select the color displayed on the first area 781 based on a color share of each of the images included in the second area to the fifth area 782-785. Regarding this, it shall be described later.

The controller 180 can display an editing-related icon on each of a plurality of the areas included in the collage wallpaper 780. For example, the controller 180 can display a first icon 791 for changing a color on the first area 781 and display a second icon to a fifth icon 792-795 for changing an image on the second area to the fifth area, respectively. If an input for selecting the first icon 791 is obtained, the controller 180 can display a user interface for setting a color displayed on the first area 781. Regarding this, it shall be described later. If an input for selecting one of the second icon to the fifth icon 792-795 is obtained, the controller 180 can replace an image of an area corresponding to the selected icon with a different image. For example, the controller 180 can replace the image with a different image among selected images or an image among randomly selected images.

The terminal 100 according to various embodiments can change collage wallpaper which is displayed according to various modification periods. Regarding this, it shall be explained with reference to FIGS. 8 to 11.

Figure 8:
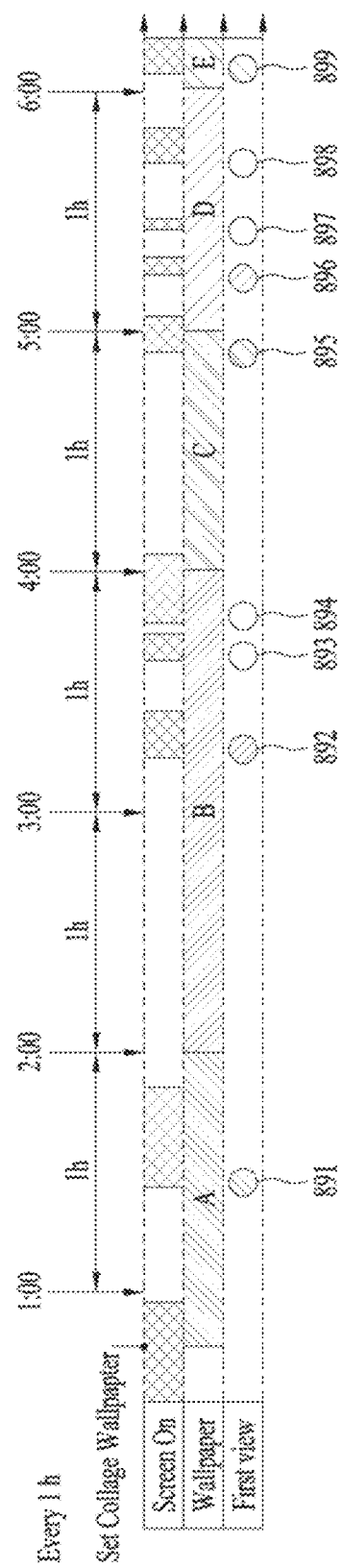
FIGS. 8 to 10 are diagrams for a modification condition and an operation of displaying a collage wallpaper according to various embodiments of the present invention.
Figure 9:
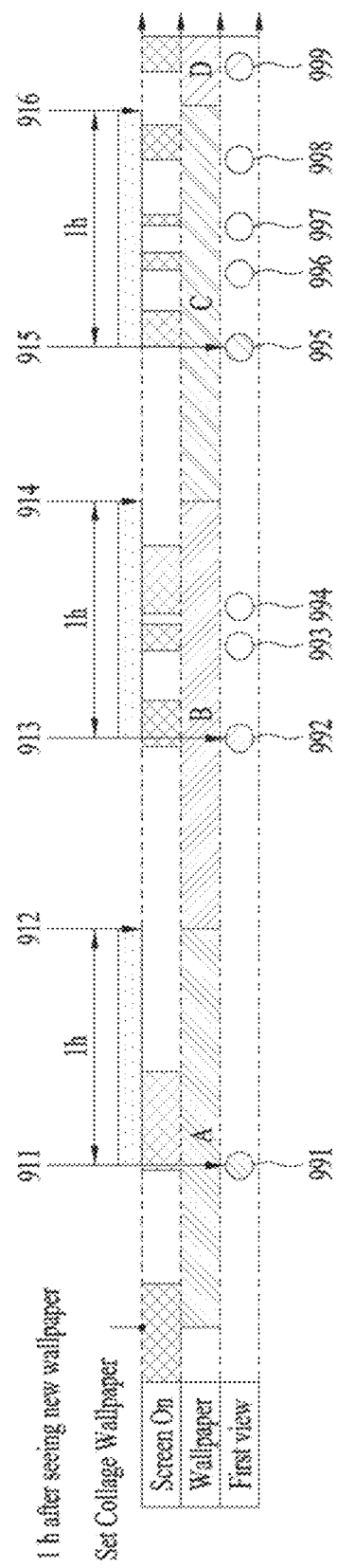
Figure 10:
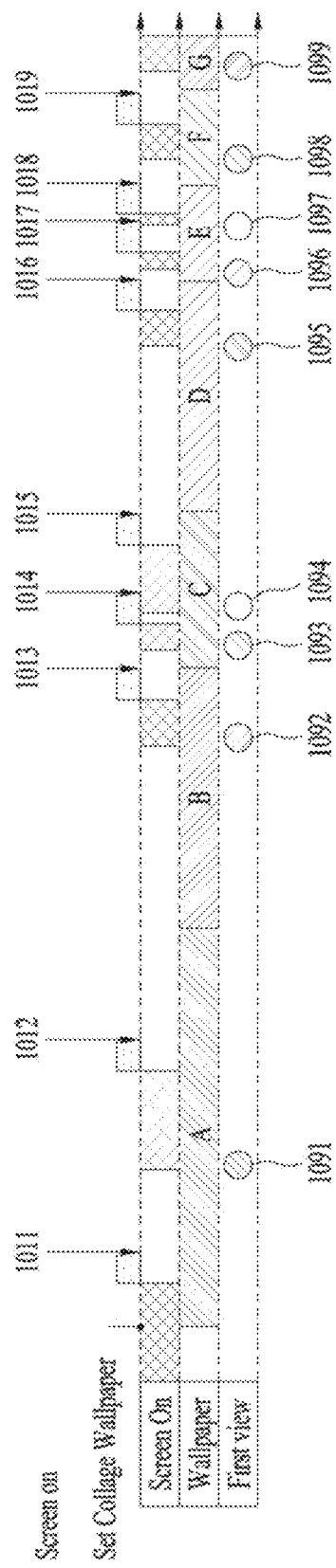

FIGS. 8 to 10 are diagrams for a modification condition and an operation of displaying a collage wallpaper according to various embodiments of the present invention.

FIG. 8 shows a modification period of 1 hour interval.

Referring to FIG. 8, the terminal 100 can change collage wallpaper at 1-hour intervals. For example, the controller 180 can change displayed wallpaper hourly using one of collage wallpapers included in a collage wallpaper set. Specifically, the controller 180 can change wallpaper to be displayed using a collage wallpaper included in the selected collage wallpaper set every hour on the hour. If the changed collage wallpaper is not displayed not even once, the controller 180 may not change the collage wallpaper. For example, if B collage wallpaper changed at 2'o'clock is not displayed not even once, the controller 180 may not change the B collage wallpaper with a different wallpaper at 3 o'clock. Hence, the controller 180 displays A collage wallpaper at first output 891 corresponding to a period between 1 o'clock and 2 o'clock, displays B collage wallpaper at second to fourth output 892-894 corresponding to a period between 3 o'clock and 4 o'clock, displays C collage wallpaper at fifth output 895 corresponding to a period between 4 o'clock and 5 o'clock, displays D collage wallpaper at sixth output to eighth output 896-898 corresponding to a period between 5 o'clock and 6 o'clock, and displays E collage wallpaper at ninth output 899 corresponding to a period between 6 o'clock and 7 o'clock. In this case, the A collage wallpaper, the B collage wallpaper, the C collage wallpaper, the D collage wallpaper, and the E collage wallpaper can be included in the same collage wallpaper set.

FIG. 9 is a diagram for a modification period of 1-hour interval from timing at which new wallpaper is displayed.

Referring to FIG. 9, the terminal 100 can change collage wallpaper hourly from timing at which the collage wallpaper is firstly displayed in a single cycle. Specifically, the controller 180 can change A collage wallpaper with B collage wallpaper at second timing 912 corresponding to 1 hour later from first timing 991 at which the A collage wallpaper is firstly displayed. The controller 180 can change the B collage wallpaper with C collage wallpaper at fourth timing 914 corresponding to 1 hour later from third timing 913 at which the B collage wallpaper is firstly displayed. And, the controller 180 can change the C collage wallpaper with D collage wallpaper at sixth timing 916 corresponding to 1 hour later from fifth timing 915 at which the C collage wallpaper is firstly displayed. Hence, the controller 180 displays the A collage wallpaper at first output 991 corresponding to a period between the first timing 911 and the second timing 912, displays the B collage wallpaper at second to fourth output 992-994 corresponding to a period between the second timing 912 and the fifth timing 915, displays the C collage wallpaper at fifth output to eighth output 995-998 corresponding to a period between the fifth timing 915 and the sixth timing 916, and displays the D collage wallpaper at ninth output 999 corresponding to a period after the sixth timing 916. The controller 180 can display the collage wallpaper in a manner of changing the collage wallpaper using the aforementioned modification period at every cycle. In this case, the A collage wallpaper, the B collage wallpaper, the C collage wallpaper, the D collage wallpaper, and the E collage wallpaper can be included in the same collage wallpaper set.

FIG. 10 shows a modification period according to an operation status of the display unit 151, e.g., screen-on.

Referring to FIG. 10, the terminal 100 can change collage wallpaper according to an operation status of the display unit 151, e.g., screen on. In this case, the screen on may correspond to turning on the display unit 151. If the display unit 151 is turned off, the controller 180 can change the collage wallpaper with a different collage wallpaper. If the display unit 151 is turned on, the controller 180 can display the changed collage wallpaper. If the display unit 151 is turned on again within a prescribed time after the display unit 151 is turned off, the controller 180 can control the previously displayed collage wallpaper to be continuously displayed. For example, if the display unit 151 is turned on again within 10 seconds after the display unit 151 is turned off, the controller 180 can display the previously displayed collage wallpaper without changing the collage wallpaper with a different collage wallpaper. Specifically, the controller 180 can change the previously displayed collage wallpaper with a different collage wallpaper at second timing 1012, third timing 1013, fifth timing 1015, sixth timing 1016, eighth timing 1018, and ninth timing 1019 corresponding to timings appearing after a prescribed time from the timing at which the display unit 151 is turned off. The controller 180 may not change the previously displayed collage wallpaper at fourth timing 1014 and seventh timing 1017 corresponding to timings appearing within a prescribed time from the timing at which the display unit 151 is turned off. Hence, the controller 180 displays A collage wallpaper at first output 1091 corresponding to a period between the first timing 1011 and the second timing 1012, displays B collage wallpaper at second output 1092 corresponding to a period between the second timing 1012 and the third timing 1013, displays C collage wallpaper at third output 1093 and fourth output 1094 corresponding to a period between the third timing 1013 and the fifth timing 1015, displays D collage wallpaper at fifth output 1095 corresponding to a period between the fifth timing 1015 and the sixth timing 1016, displays E collage wallpaper at sixth output 1096 and seventh output 1097 corresponding to a period between the sixth timing 1016 and the eight timing 1018, displays F collage wallpaper at eighth output 1098 corresponding to a period between the eighth timing 1018 and the ninth timing 1019, and displays G collage wallpaper at ninth output 1099 corresponding to a period after the ninth timing 1019. In this case, the A collage wallpaper, the B collage wallpaper, the C collage wallpaper, the D collage wallpaper, the E collage wallpaper, the F collage wallpaper, and the G collage wallpaper can be included in the same collage wallpaper set.

A specific embodiment for displaying collage wallpaper according to the aforementioned modification period is explained with reference to FIG. 11 in the following.

Figure 11:
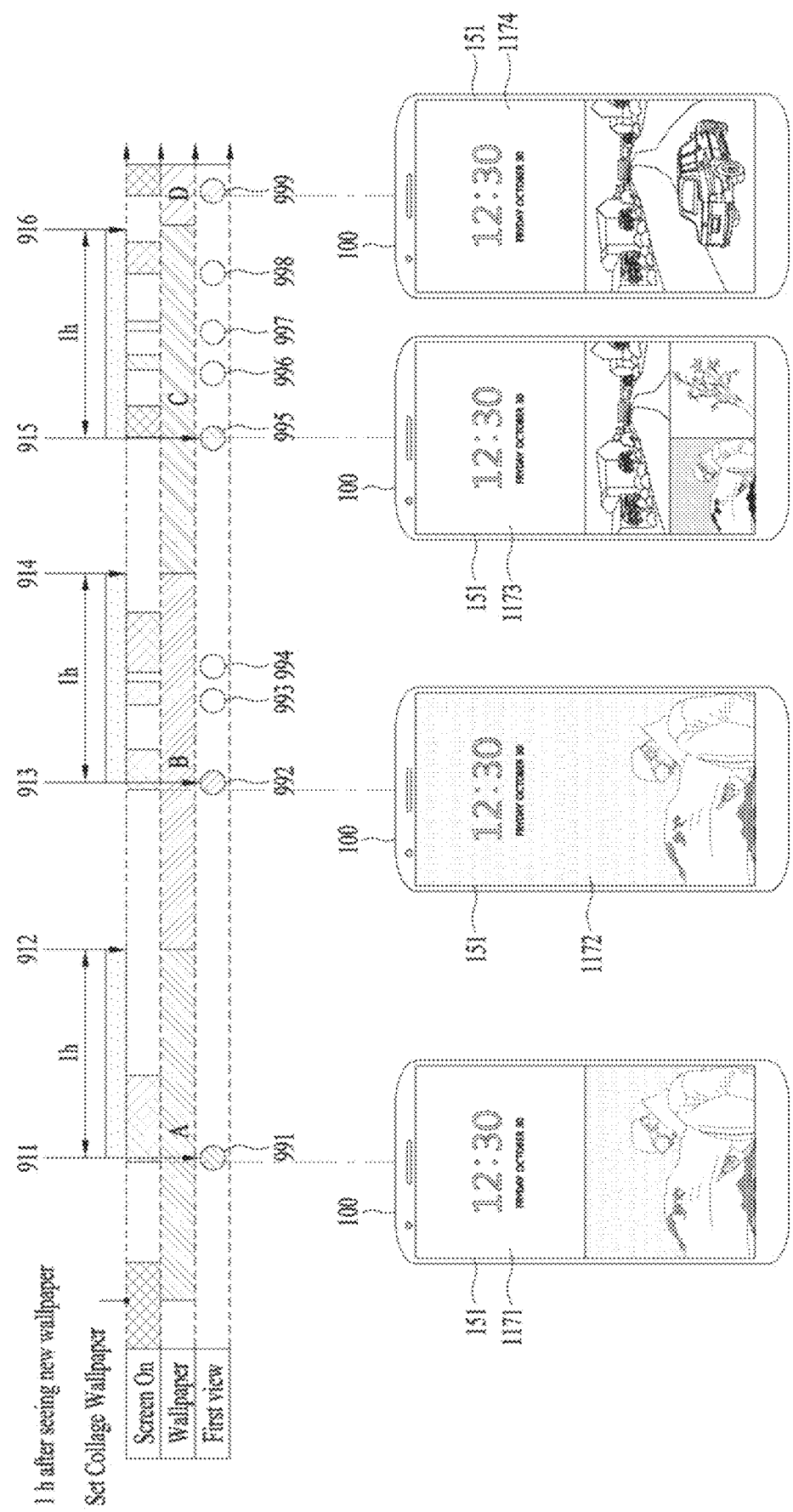
FIG. 11 is a diagram for an example of displaying a collage wallpaper according to various embodiments of the present invention.

FIG. 11 is a diagram for an example of displaying a collage wallpaper according to various embodiments of the present invention.

Referring to FIG. 11, the terminal 100 can change collage wallpaper hourly from timing at which wallpaper is displayed.

The terminal 100 can change collage wallpaper hourly from timing at which the collage wallpaper is firstly displayed in a single cycle. Specifically, the controller 180 can change A collage wallpaper into B collage wallpaper at second timing 912 corresponding to 1-hour later of first timing 991 at which the A collage wallpaper is firstly displayed and change the B collage wallpaper into C collage wallpaper at fourth timing 914 corresponding to 1-hour later of third timing 993 at which the B collage wallpaper is firstly displayed. And, the controller 180 can change the C collage wallpaper into D collage wallpaper at sixth timing 916 corresponding to 1-hour later of fifth timing 915 at which the C collage wallpaper is firstly displayed. Hence, the controller 180 displays the A collage wallpaper 1171 at first output corresponding to a period between the first timing 911 and the second timing 912, displays the B collage wallpaper 1172 at second output to fourth output 992-994 corresponding to a period between the second timing 912 and the fifth timing 915, displays the C collage wallpaper 1173 at fifth output to eighth output 995-998 corresponding to a period between the fifth timing 915 and the sixth timing 916, and can display D collage wallpaper 1174 at ninth output 999 corresponding to a period after the sixth timing 916.

The terminal 100 according to various embodiments can receive a configuration input for the aforementioned modification period. Regarding this, it is explained with reference to FIGS. 12 to 13 in the following.

Figure 12:
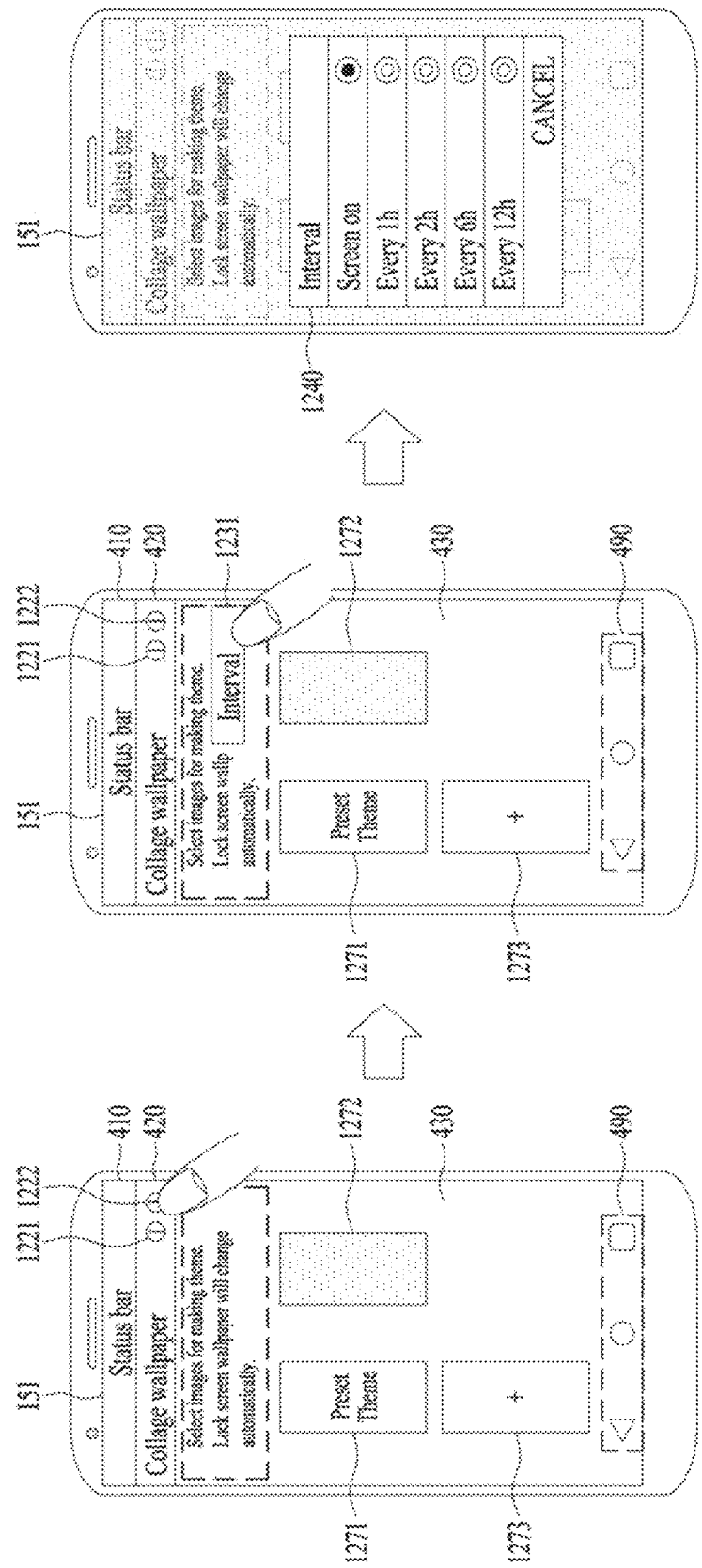
FIG. 12 is a diagram for an example of setting a modification period according to various embodiments of the present invention.

FIG. 12 is a diagram for an example of setting a modification period according to various embodiments of the present invention.

Figure 13:
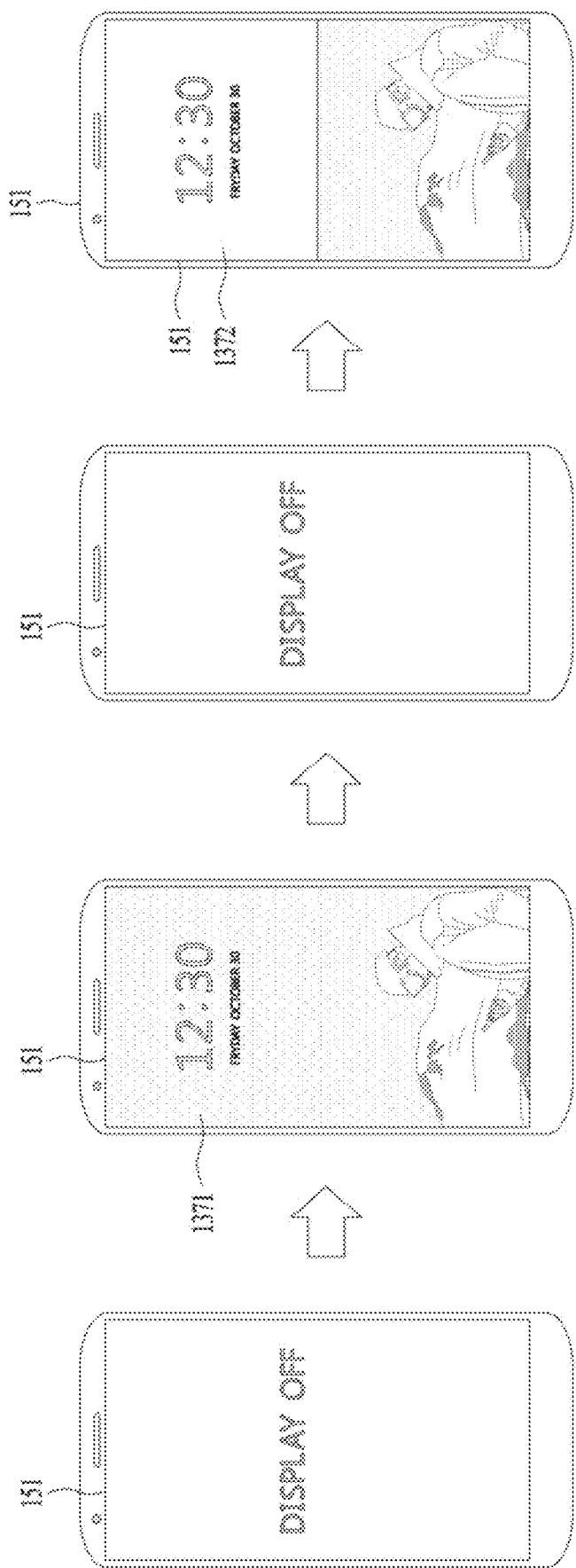
FIG. 13 is a diagram for an example of modifying a collage wallpaper according to various embodiments of the present invention.

FIG. 13 is a diagram for an example of modifying a collage wallpaper according to various embodiments of the present invention.

Referring to FIG. 12, the terminal 100 can display a plurality of collage wallpaper sets on the display unit 151. For example, the controller 180 displays a title for a collage wallpaper on a title area 420, displays a plurality of theme images 1271/1272 corresponding to a plurality of the collage wallpaper sets on a main area 430, and displays an add menu 1273 for adding a new collage wallpaper. The controller 180 can also display icons 1221/1222 related to a collage wallpaper on the title area 420. For example, a first icon 1221 may correspond to an icon for deleting a collage wallpaper set and a second icon 1222 may correspond to an icon for displaying a menu related to a collage wallpaper. If an input for selecting the second icon 1222 is obtained, the controller 180 can display a menu related to a collage wallpaper and the menu can include a modification period menu 1231 as well. The controller 180 can display the modification period menu 1231. If an input for selecting the displayed modification period menu 1231 is obtained, the controller 180 can display a menu 1240 for setting a modification period. For example, the controller 180 can display a setting menu based on a time interval reference on the modification period setting menu 1240 and can obtain an input for selecting one of displayed references. For example, the controller 180 can obtain an input for selecting screen-on from the displayed setting menu 1231. The controller 180 can determine a modification period at which a displayed collage wallpaper is modified according to the screen-on corresponding to the selected reference. For example, as shown in FIG. 13, the controller 180 can modify a collage wallpaper, which is displayed whenever the display unit 151 is turned on from a state of being turned off. In particular, the controller 180 can display a first collage wallpaper 1371 at a first screen-on and display a second collage wallpaper 1372 at a second screen-on.

In the foregoing description, a modification period is configured on the basis of a time interval or screen-on, by which the present invention may be non-limited. A modification period setting menu can be provided according to various references.

The terminal 100 according to various embodiments can obtain an input for configuring a modification order of a plurality of collage wallpapers included in a collage wallpaper set and can modify a plurality of the collage wallpapers according to the configured order. Regarding this, it is explained with reference to FIG. 14 in the following.

Figure 14:
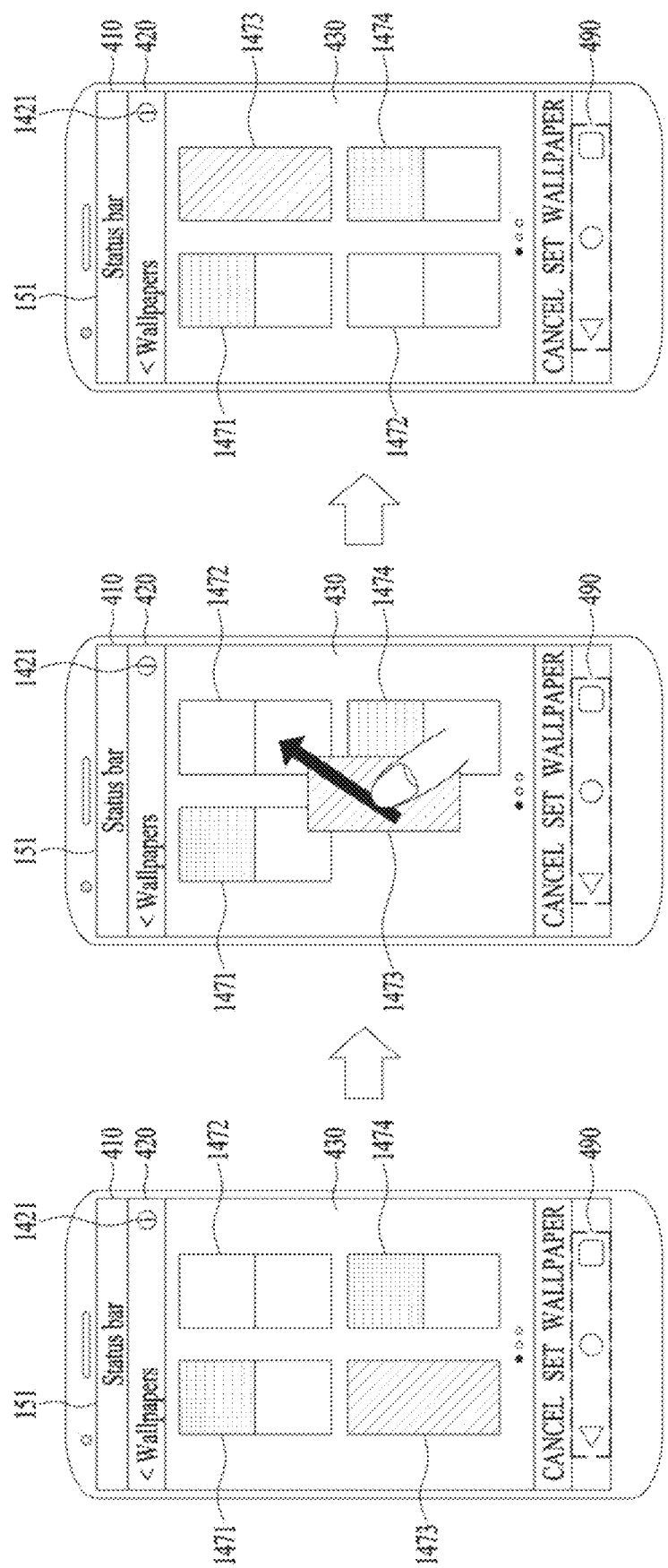
FIG. 14 is a diagram for an example of setting a modification order according to various embodiments of the present invention.

FIG. 14 is a diagram for an example of setting a modification order according to various embodiments of the present invention.

Referring to FIG. 14, the terminal 100 can display a plurality of collage wallpapers including a first collage wallpaper 1471, a second collage wallpaper 1472, a third collage wallpaper 1473, and a fourth collage wallpaper 1474 included in a collage wallpaper set on the display unit 151. For example, the controller 180 displays a title for a wallpaper on a title area 420 and can display a plurality of the collage wallpapers 1471-1474 on a main area 430. When the terminal 100 modifies a plurality of the displayed collage wallpapers 1471-1474 according to a modification period, the terminal can modify a plurality of the displayed collage wallpapers in an order of the first collage wallpaper 1471, the second collage wallpaper 1472, the third collage wallpaper 1473, and the fourth collage wallpaper 1474. If an input for modifying arrangement of a plurality of the displayed collage wallpapers is obtained, the terminal 100 can change a modification order of the collage wallpapers according to the modified arrangement. For example, the controller 180 can obtain an input for long touching the third collage wallpaper 1473 and dragging the third collage wallpaper to a position at which the second collage wallpaper 1472 is displayed. The controller 180 displays the third collage wallpaper 1473 at the position at which the second collage wallpaper 1472 was displayed and displays the second collage wallpaper 1472 at a position at which the third collage wallpaper was displayed according to the obtained input. And, the terminal 100 can change a modification order of collage wallpapers according to a modified arrangement. For example, when the terminal 100 modifies a plurality of the displayed collage wallpapers according to a modification period, the terminal can modify a plurality of the displayed collage wallpapers in an order of the first collage wallpaper 1471, the third collage wallpaper 1473, the second collage wallpaper 1472, and the fourth collage wallpaper 1474. In particular, the terminal 100 can obtain an input for configuring a modification order according to a wallpaper modification period and can change a displayed wallpaper according to a modified order.

The terminal 100 according to various embodiments can obtain an input for configuring at least one selected from the group consisting of a display size, a display proportion, and a display area of an image displayed on a collage wallpaper. The terminal can generate a collage wallpaper to which the display size, the display proportion, and the display area of the image are applied according to the obtained input. In particular, the terminal 100 can edit an image included in a collage wallpaper, generate the edited collage wallpaper, and display the edited collage wallpaper. Regarding this, it is explained with reference to FIGS. 15 to 17 in the following.

FIG. 15 is a diagram for an example of editing an image of a collage wallpaper according to various embodiments of the present invention.

Referring to FIG. 15, the terminal 100 can display a plurality of collage wallpapers including a first collage wallpaper 1571, a second collage wallpaper 1572, a third collage wallpaper 1573, and a fourth collage wallpaper 1574 included in a collage wallpaper set on the display unit 151. For example, the controller 180 displays a title for a wallpaper on a title area 420 and can display a plurality of the collage wallpapers 1571-1574 on a main area 430. The terminal 100 can obtain an input for editing one selected from the group consisting of a display size, a display proportion, and a display area of an image included in a plurality of the displayed collage wallpapers 1571-1574. Specifically, the terminal 100 can obtain an input for selecting a collage wallpaper to be edited from among a plurality of the collage wallpapers 1571-1574. For example, the controller 180 can obtain an input for selecting a fourth collage wallpaper 1574 from among a plurality of the displayed collage wallpapers 1571-1574. The controller 180 can display the selected fourth collage wallpaper 1574 on the main area 430. The selected fourth collage wallpaper 1574 can include a first area 1581 on which one color is displayed and second area to fifth area 1582-1585 on which a plurality of images are displayed, respectively. In this case, the number of areas may vary according to the number of images included in a collage wallpaper.

The controller 180 can obtain an input for editing at least one image included in the fourth collage wallpaper 1574. For example, the controller 180 can obtain an input for editing the fifth area 1585 among a plurality of areas included in the fourth collage wallpaper 1574. As an embodiment, the controller 180 can obtain an input for pinch-out the fifth area 1585 as an input for editing the fifth area. In this case, the pinch-out may correspond to an input that two fingers are moving in an opposite direction. The controller 180 can display a screen for editing the fifth area 1585 corresponding to the selected area. Regarding this, it is explained with reference to FIGS. 16 and 17 in the following.

FIG. 16 is a diagram for an example of editing an image area according to various embodiments of the present invention.

The controller 180 can display a screen for editing an image displayed on a selected fifth area 1585. For example, as shown in FIG. 16, the controller 180 can display a first image 1661 displayed on the fifth area 1585 and display a display indicator 1670 indicating an area displayed on the fifth area 1585. In this case, the display indicator may have a rectangular shape. The controller 180 can obtain an input for moving the display indicator 1670 displayed on the first image 1661 and display an internal area of the moved display indicator 1670 on the fifth area 1585 of the fourth collage wallpaper 1574. For example, as shown in FIG. 16, the controller 180 can obtain an input for dragging the display indicator 1670 displayed on the first image 1661 to the bottom and display the internal area of the moved display indicator 1670 on the fifth area 1585 of the fourth collage wallpaper 1574. In particular, the terminal 100 can edit a display area of an image displayed on an area included in a collage wallpaper.

FIG. 17 is a diagram for an example of editing an image display proportion according to various embodiments of the present invention.

Referring to FIG. 17, the controller 180 can display a screen for editing an image displayed on a selected fifth area 1585. For example, as shown in FIG. 17, the controller 180 can display a first image 1661 displayed on the fifth area 1585 and display a display indicator 1670 indicating an area displayed on the fifth area 1585. In this case, the display indicator may have a rectangular shape. The controller 180 can obtain an input for adjusting a proportion or a size of the display indicator 1670 and display an internal area of the display indicator 1670 on the fifth area 1585 of the fourth collage wallpaper 1574 according to the adjusted proportion or the size. For example, as shown in FIG. 17, the controller 180 can obtain an input for adjusting a proportion of the display indicator 1670 displayed on the first image 1661 and display the internal area of the display indicator 1670 on the fifth area 1585 of the fourth collage wallpaper 1574 according to the adjusted proportion. In particular, the terminal 100 can adjust a display area of an image displayed on an area included in a collage wallpaper.

Meanwhile, if there is a difference in a size or a proportion between an internal area of a display indicator for an image to be displayed on a partial area of a collage wallpaper and an area displayed on the collage wallpaper, it may be able to adjust a size and/or a proportion of the internal area of the display indicator 1670 to match the size and/or the proportion of the internal area with the area to be displayed on the collage wallpaper. For example, in order to make a collage wallpaper have no empty space, it may be able to magnify or move all or a part of an image to be displayed.

The controller 180 recognizes a person or an object from an image to be displayed on a partial area of a collage wallpaper and can control a display area to make the recognized person or the object to be positioned at the center of the display area.

The terminal 100 according to various embodiments can obtain an input for editing a color area included in a partial area of a collage wallpaper and display the edited color area on the collage wallpaper. In this case, the color area may correspond to an area for displaying one color on a partial area of a collage wallpaper or an area to which a specific pattern is applied.

Regarding this, it is explained with reference to FIGS. 18 to 22 in the following.

Figure 18:
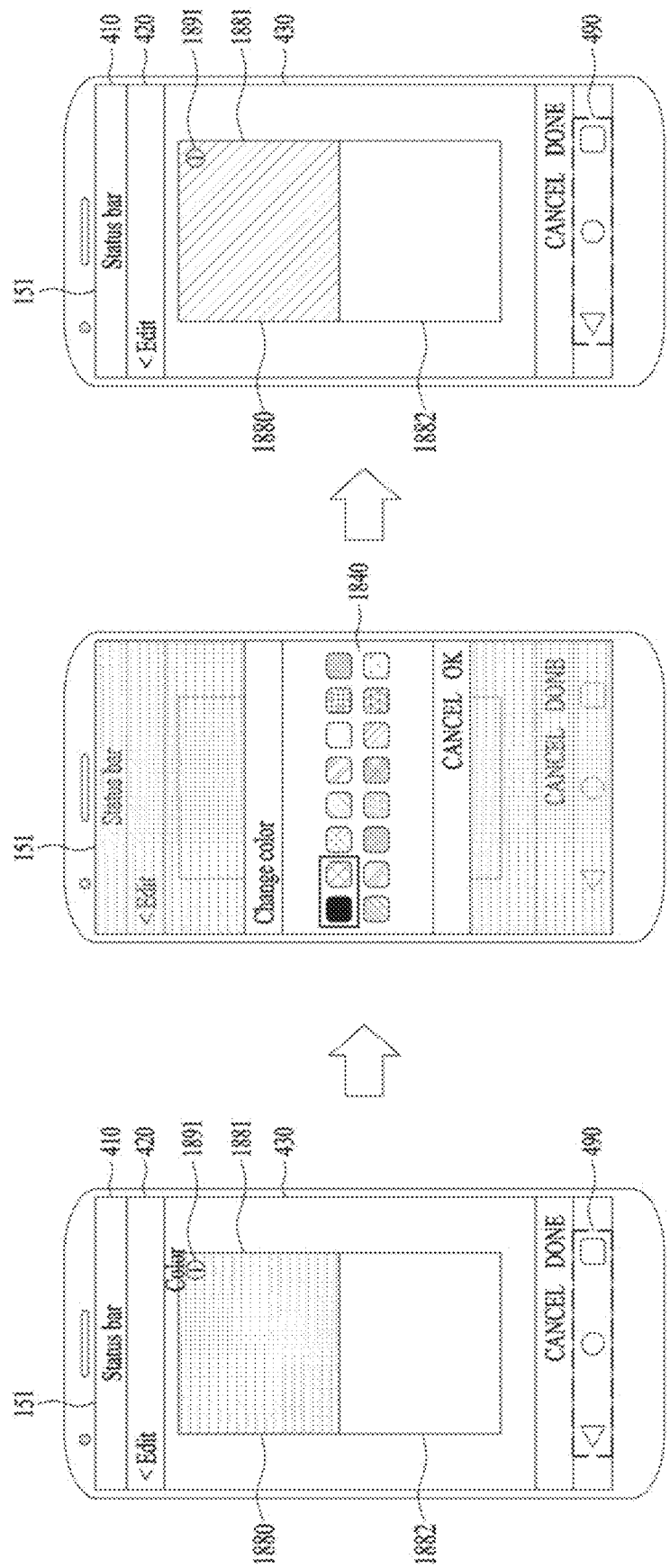
FIG. 18 is a diagram for an example of editing a color area according to various embodiments of the present invention.

FIG. 18 is a diagram for an example of editing a color area according to various embodiments of the present invention.

Referring to FIG. 18, the terminal 100 can display a collage wallpaper 1880. The collage wallpaper 1880 generated by the terminal 100 can include a color area 1881 and an image area 1882. In this case, one or a plurality of images can be displayed on the image area 1882. And, one color can be displayed on the color area 1881 or a pattern can be applied to the color area. The controller 180 can display an icon 1891 for editing a color on the color area 1881 of the collage wallpaper 1880. If an input for selecting the icon 1891 is obtained, the controller 180 can display an editing menu 1840 for editing a color and/or a pattern displayed on the color area 1881. For example, the controller 180 can display a plurality of color blocks capable of selecting a color to be displayed on the color area 1881 on the editing menu 1840. The controller 180 can display a block corresponding to a color currently displayed on the color area 1881 in a manner of being distinguished from a different block. For example, the controller 180 can display a selection box on the block corresponding to the color currently displayed on the color area 1881. The controller 180 can obtain an input for selecting at least one of color blocks displayed on the editing menu 1840 and display a color corresponding to the selected color block on the color area 1881. For example, the controller 180 can obtain an input for selecting a second color in the editing menu 1840 in response to the color area 1881 on which a first color is displayed. The controller 180 can display the second color on the color area 1881 of the collage wallpaper according to the obtained input. In particular, the terminal 100 can obtain a color editing input inputted on a color area included in a collage wallpaper and edit a color displayed on the color area according to the input.

The terminal 100 according to various embodiments can select a color to be displayed on a color area included in a collage wallpaper based on an image included in the collage wallpaper. Regarding this, it is explained with reference to FIGS. 19 and 20 in the following.

Figure 19:
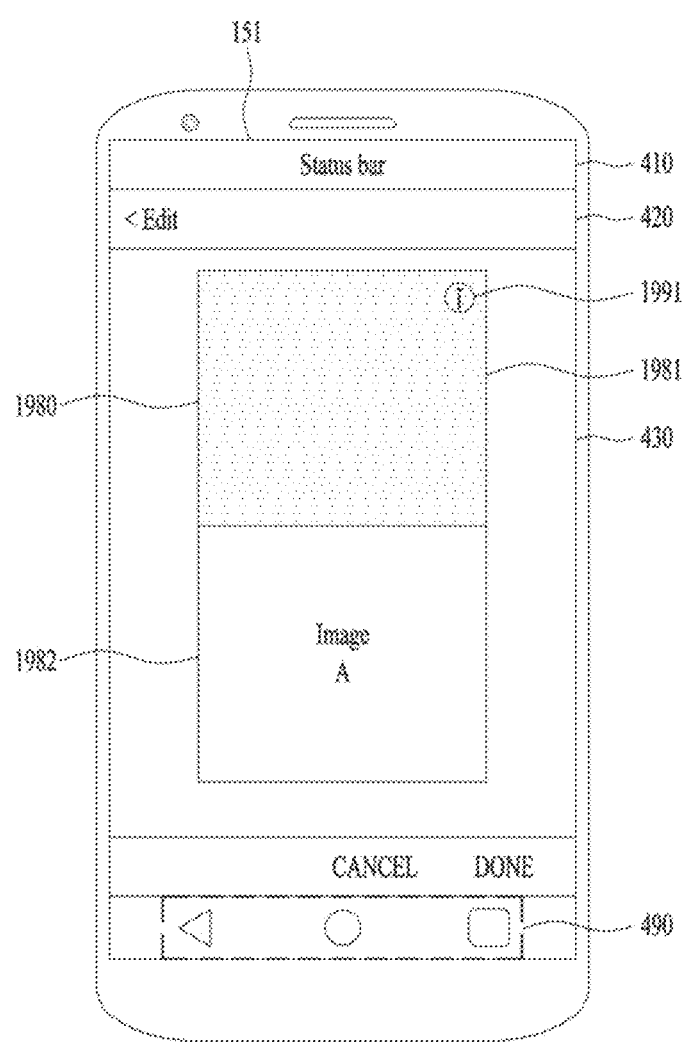
FIGS. 19 to 20 are diagrams for an example of extracting a color according to various embodiments of the present invention.
Figure 20:
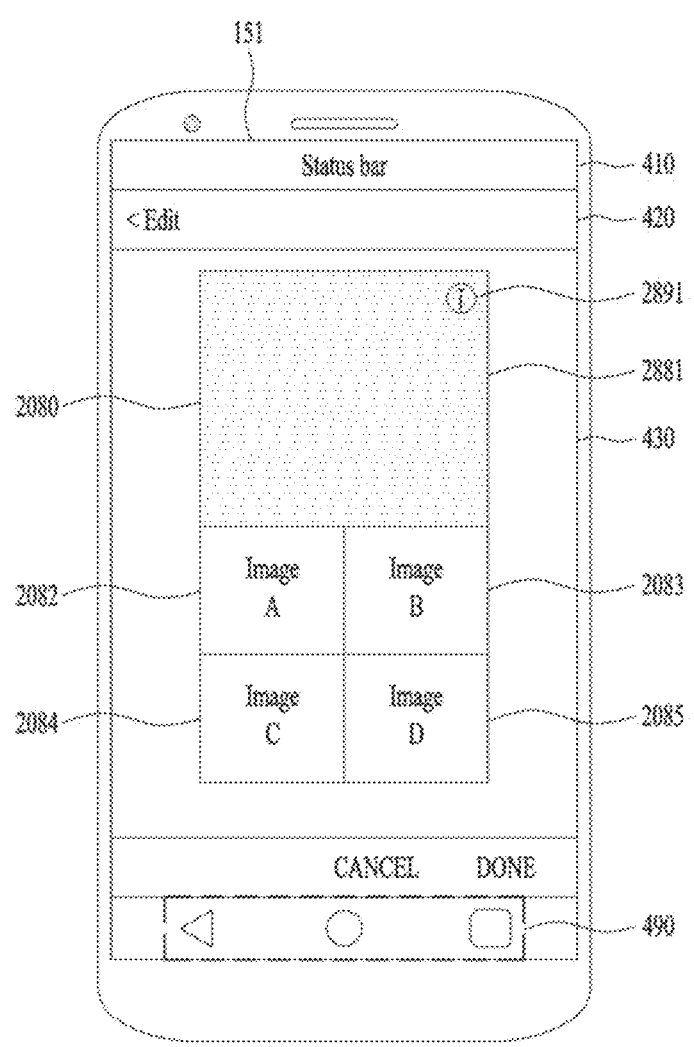

FIGS. 19 to 20 are diagrams for an example of extracting a color according to various embodiments of the present invention.

Referring to FIG. 19, the controller 190 can display a generated collage wallpaper 1980. The collage wallpaper 1980 generated by the terminal 100 can include a color area 1981 and an image area 1982. One color can be displayed on the color area 1981 and at least one image can be displayed on the image area 1982. The controller 180 can select a color to be displayed on the color area 1981 based on share of colors included in the image area 1982. For example, the controller 180 can determine share of a color included in an image A displayed on the image area 1982 based on a color of each of a plurality of pixels of the image displayed on the image area 1982. In this case, the share may correspond to a proportion occupied by the color among colors of a plurality of the pixels included in the image. As an embodiment, the controller 180 can select a color of highest proportion in the image A displayed on the image area 1982 as a color to be displayed on the color area 1981. As a different example, the controller 180 combines a plurality of colors of which share is equal to or greater than a prescribed ratio in the image A displayed on the image area 1982 to determine a color. The controller can select the color as a color to be displayed on the color area 1981. As a further different example, the controller 180 combines several colors of which share is high in the image displayed on the image area to determine a color. The controller can select the color as a color to be displayed on the color area 1981.

Referring to FIG. 20, the controller 190 can display a generated collage wallpaper 2080. The collage wallpaper 2080 generated by the terminal 100 can include a color area 2081 and a plurality of image areas 2082-2085. One color can be displayed on the color area 2081 and at least one image can be displayed on each of a plurality of the image areas 2082-2085. The controller 180 can select a color to be displayed on the color area 2081 based on share of colors included in a plurality of the image areas 2082-2085. For example, the controller 180 can determine share of a color included in an image displayed on the image area 2082 based on colors of a plurality of pixels of each of a plurality of images displayed on a plurality of the image areas 2082-2085. In this case, the share may correspond to a proportion occupied by the color among colors of a plurality of the pixels included in the image. As an embodiment, the controller 180 can select a color of highest proportion in an image A, an image B, an image C, and an image D respectively displayed on each of a plurality of the image areas 2082-2085 as a color to be displayed on the color area 2081. As a different example, the controller 180 combines a plurality of colors of which share is equal to or greater than a prescribed ratio in a plurality of images displayed on a plurality of the image areas 2082-2085 to determine a color. The controller can select the color as a color to be displayed on the color area 2081. As a further different example, the controller 180 combines several colors of which share is high in a plurality of images displayed on a plurality of the image areas 2082-2085 to determine a color. The controller can select the color as a color to be displayed on the color area 2081.

In particular, the terminal 100 can select a color to be displayed on a color area of a collage wallpaper based on images included in the collage wallpaper and can display the selected color on the color area.

The terminal 100 according to various embodiments can apply a pattern to a color area included in a collage wallpaper and display the collage wallpaper including the color area to which the pattern is applied. Regarding this, it is explained with reference to FIGS. 21 to 22 in the following.

Figure 21:
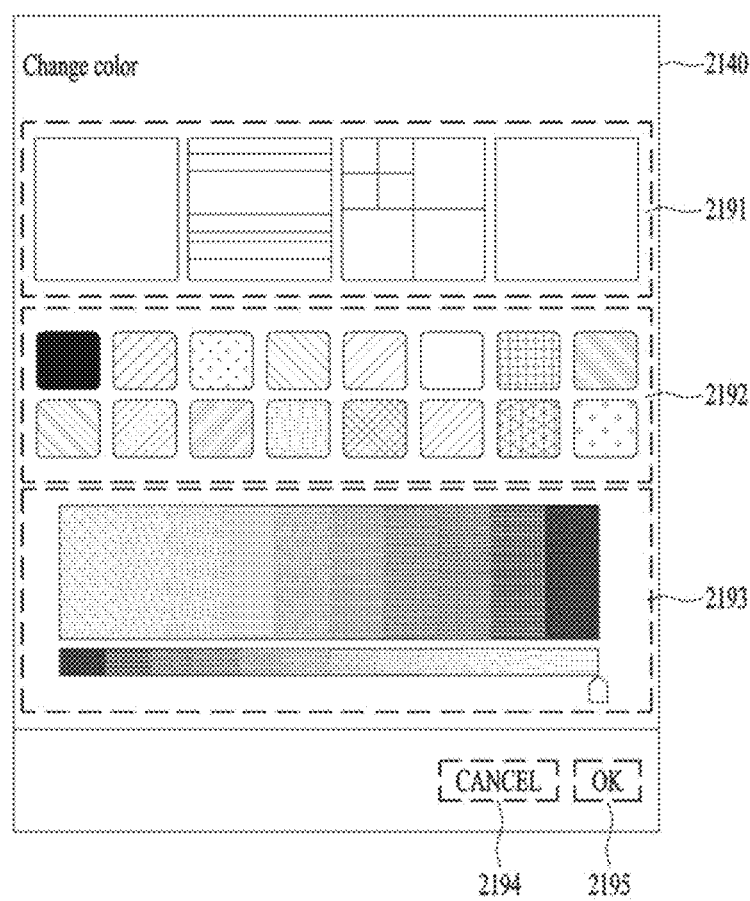
FIG. 21 is a diagram for an example of a color area editing menu according to various embodiments of the present invention.

FIG. 21 is a diagram for an example of a color area editing menu according to various embodiments of the present invention.

Referring to FIG. 21, the controller 180 can display an editing menu 2140 for editing a color, a pattern, and the like of a color area included in a collage wallpaper on the display unit 151. For example, the controller 180 can display a pattern menu 2191, a color block 2192, and a color palette 2913 on the editing menu 2140 and can further display a cancel button 2194 and an OK button for editing. In this case, the pattern menu 2191 may correspond to a menu for selecting a pattern to be displayed on a color area, the color block 2192 may correspond to a menu for selecting a color to be displayed on the color area, and the color palette 2913 may correspond to a menu for combining colors to be displayed on the color area. The cancel button 2194 may correspond to a button for cancelling color editing and the OK button 2195 may correspond to a button for granting color editing. The controller 180 can obtain an input inputted on the menus displayed on the editing menu 2140 and display a color area to which a color according to a selected menu or a color and a pattern are applied on a collage wallpaper.

Figure 22:
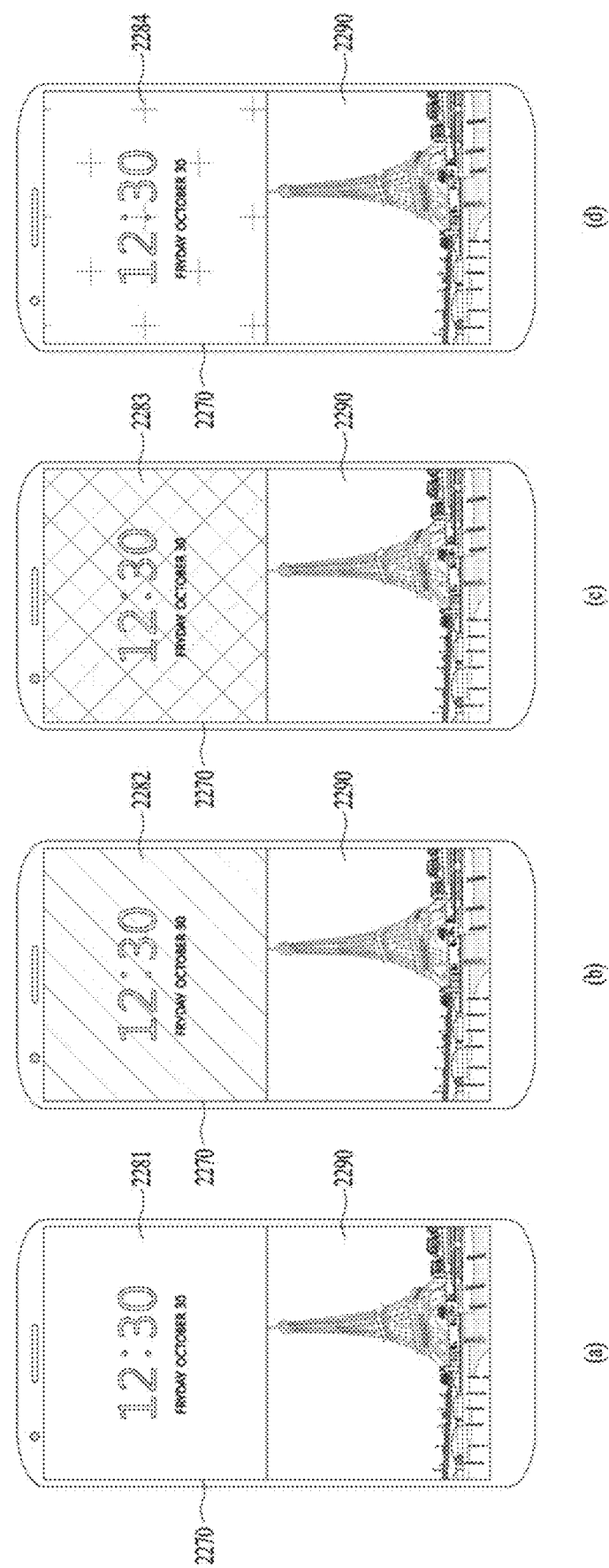
FIG. 22 is a diagram for an example of a color area to which a selected pattern is applied according to various embodiments of the present invention.

FIG. 22 is a diagram for an example of a color area to which a selected pattern is applied according to various embodiments of the present invention.

Referring to FIG. 22 (*a*), the controller 180 can display a collage wallpaper 2270 including a color area 2281 to which a pattern is not applied and an image area 2290 on which one image is displayed.

Referring to FIG. 22 (*b*), the controller 180 can display a collage wallpaper 2270 including a color area 2282 to which a first pattern is applied and an image area 2290 on which one image is displayed.

Referring to FIG. 22 (*c*), the controller 180 can display a collage wallpaper 2270 including a color area 2283 to which a second pattern is applied and an image area 2290 on which one image is displayed.

Referring to FIG. 22 (*d*), the controller 180 can display a collage wallpaper 2270 including a color area 2284 to which a third pattern is applied and an image area 2290 on which one image is displayed.

In particular, the terminal 100 can apply a pattern to a color area included in a collage wallpaper and display the collage wallpaper including the color area to which the pattern is applied. The terminal 100 can also apply a transparent pattern to the color area. For example, the terminal 100 can apply a pattern to the color area in a manner of displaying a pattern layer of high transparency on the color area. The terminal 100 can control transparency and a color of a pattern to be applied according to a color displayed on the color area. For example, the terminal 100 can control the transparency and the color of the pattern to be applied to the color area to make a color displayed on the color area to be well displayed. The terminal 100 according to various embodiments can generate a collage wallpaper by applying various layouts. The terminal 100 can generate a plurality of collage wallpapers to which various layouts are applied according to the number of images which are selected at the time of generating the collage wallpaper. Regarding this, it is explained with reference to FIG. 23 in the following.

FIG. 23 is a diagram for layouts applied to a collage wallpaper according to various embodiments of the present invention.

Referring to FIG. 23, if a single image is selected as an image for generating a collage wallpaper, the terminal 100 can generate a collage wallpaper to which a layout A for displaying the selected image in a full size is applied and a collage wallpaper to which a layout B including a color area and an image area displaying the selected image is applied. In particular, if a single image is selected, the terminal 100 can generate two collage wallpapers.

If two images are selected as images for generating a collage wallpaper, the terminal 100 generates two collage wallpapers to which a layout A for displaying each of the selected two images in full size is applied, two collage wallpapers to which a layout B including a color area and an image area on which the selected images are displayed is applied, and two collage wallpapers to which a layout C for displaying the selected two images together is applied. In particular, if two images are selected, the terminal 100 can generate six collage wallpapers.

If three images are selected as images for generating a collage wallpaper, the terminal 100 generates three collage wallpapers to which a layout A for displaying each of the selected three images in full size is applied, three collage wallpapers to which a layout B including a color area and an image area on which the selected images are displayed is applied, and two collage wallpapers to which a layout C for displaying two images together among the selected three images is applied. In particular, if three images are selected, the terminal 100 can generate eight collage wallpapers.

If four images are selected as images for generating a collage wallpaper, the terminal 100 generates four collage wallpapers to which a layout A for displaying each of the selected four images in full size is applied, four collage wallpapers to which a layout B including a color area and an image area on which the selected images are displayed is applied, and two collage wallpapers to which a layout C for displaying two images together among the selected four images is applied. The terminal 100 can generate collage wallpaper to which a layout D having one color area and a plurality of color areas and a layout E are applied. Specifically, the terminal 100 displays a single image only among the selected four images on the half of the collage wallpaper and the rest of the collage wallpaper is divided into four areas. The terminal displays a color area on an area of the four areas and can generate single collage wallpaper to which the layout D for respectively displaying the remaining three images among the selected four images on the remaining three areas is applied. The terminal 100 displays a color area on the half of collage wallpaper and the rest of the collage wallpaper is divided into four areas. The terminal can generate single collage wallpaper to which the layout E for respectively displaying the selected images on the divided four areas is applied. In particular, if four images are selected, the terminal 100 can generate twelve collage wallpapers.

The terminal 100 can generate collage wallpaper to which various layouts are applied according to the number of selected images.

The terminal 100 according to various embodiments can display a plurality of collage wallpapers to which various layouts are applied in a predetermined order when the collage wallpapers are modified according to a wallpaper modification period. Regarding this, it is explained with reference to FIG. 24 in the following.

FIG. 24 is a diagram for a display order of a layout applied to a collage wallpaper according to various embodiments of the present invention.

Referring to FIG. 24, when a plurality of collage wallpapers to which a layout is applied are displayed according to the number of selected images, the terminal 100 can display a plurality of the collage wallpapers according to a predetermined order. For example, if a single image is selected, the terminal 100 can display a plurality of the collage wallpapers in an order of a first collage wallpaper to which a layout B is applied and a second collage wallpaper to which a layout A is applied. If two images are selected, the terminal 100 can display a plurality of the collage wallpapers in an order of a first collage wallpaper to which a layout B is applied, a second collage wallpaper to which a layout C is applied, a third collage wallpaper to which a layout A is applied, a fourth collage wallpaper to which the layout B is applied, a fifth collage wallpaper to which the layout C is applied, and a sixth collage wallpaper to which the layout A is applied. If three images are selected, the terminal 100 can display a plurality of the collage wallpapers in an order of a first collage wallpaper to which a layout B is applied, a second collage wallpaper to which a layout C is applied, a third collage wallpaper to which a layout A is applied, a fourth collage wallpaper to which the layout B is applied, a fifth collage wallpaper to which the layout C is applied, a sixth collage wallpaper to which the layout A is applied, a seventh collage wallpaper to which the layout B is applied, and an eighth collage wallpaper to which the layout A is applied. If four images are selected, the terminal 100 can display a plurality of the collage wallpapers in an order of a first collage wallpaper to which a layout B is applied, a second collage wallpaper to which a layout C is applied, a third collage wallpaper to which a layout A is applied, a fourth collage wallpaper to which the layout B is applied, a fifth collage wallpaper to which the layout C is applied, a sixth collage wallpaper to which the layout A is applied, a seventh collage wallpaper to which the layout B is applied, an eighth collage wallpaper to which the layout A is applied, a ninth collage wallpaper to which the layout B is applied, a tenth collage wallpaper to which the layout A is applied, an eleventh collage wallpaper to which a layout D is applied, and a twelfth collage wallpaper to which a layout E is applied.

Since the terminal 100 is able to display a plurality of collage wallpapers to which various layouts are applied according to a predetermined order, the terminal may not continuously display collage wallpapers to which the same layout is applied.

The terminal 100 according to various embodiments can obtain an input for changing one of a plurality of images included in single collage wallpaper with a different image and can display collage wallpaper including the changed image according to the obtained input. When an image is changed, the terminal can change the image in an order of not displaying an image identical to an image displayed on a different area of collage wallpaper. Regarding this, it is explained with reference to FIG. 25 in the following.

Figure 25:
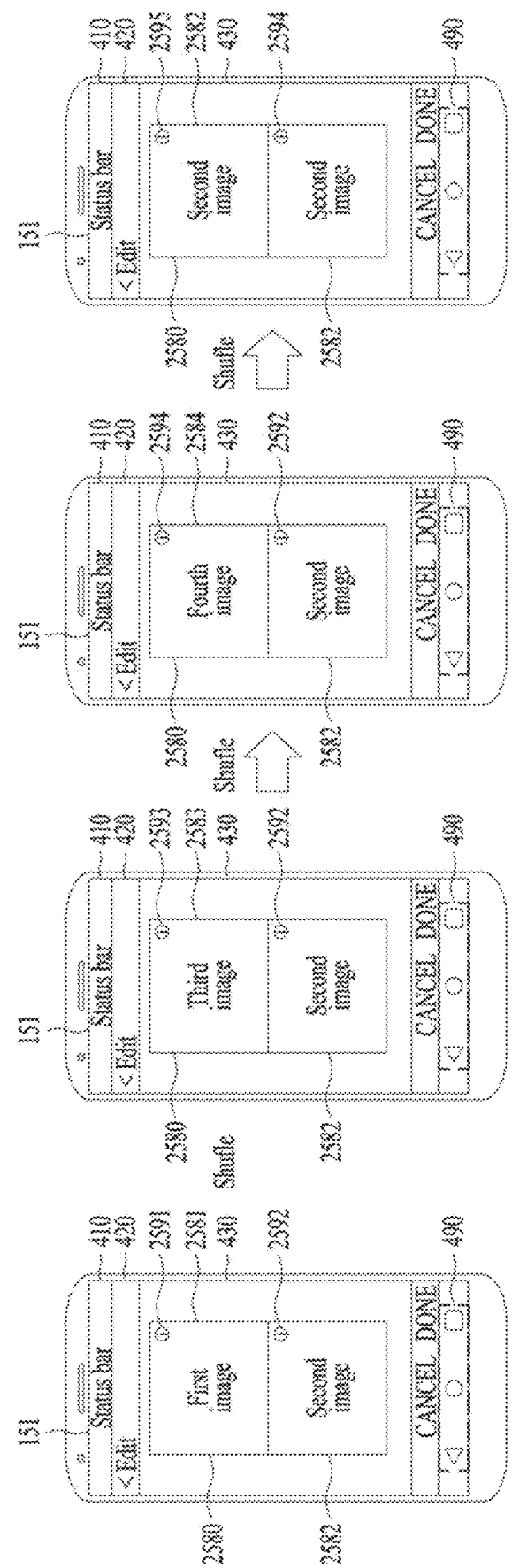
FIG. 25 is a diagram for an example of modifying an image according to various embodiments of the present invention.

FIG. 25 is a diagram for an example of modifying an image according to various embodiments of the present invention.

Referring to FIG. 25, the terminal 100 can display a first collage wallpaper 2580 including a first image 2581 at the top of the first collage wallpaper and a second image 2582 at the bottom of the first collage wallpaper. In this case, a collage wallpaper set including the first collage wallpaper may correspond to a collage wallpaper set generated by selecting the first to the fourth image 2581-2594. The terminal 100 can display a first icon 2591 for modifying the first image 2581 at the top of the first collage wallpaper 2580 and a second icon 2592 for modifying the second image 2582 at the bottom of the first collage wallpaper 2580. In this case, an input for displaying a different image rather than a displayed image can be referred to as a shuffle input.

In order to change the first image displayed at the top of the first collage wallpaper 2580 with a different image, the terminal 100 can obtain an input for selecting the first icon 2591. In particular, the terminal 100 can change the image displayed at the top of the first collage wallpaper 2580 with a different image, which is not overlapped with the second image 2582 displayed at the bottom of the first collage wallpaper 2580. For example, the terminal 100 can display a third image 2583 at the top of the first collage wallpaper 2580 according to an input for selecting the first icon 2591 and can display a third icon 2593 for changing the third image 2583. In order to change the third image 2583 displayed at the top of the first collage wallpaper 2580 with a different image, the terminal 100 can obtain an input for selecting the third icon 2593. The terminal 100 can display a fourth image 2584 at the top of the first collage wallpaper 2580 according to an input for selecting the third icon 2593 and can display a fourth icon 2594 for changing the fourth image 2584. In order to change the fourth image 2584 displayed at the top of the first collage wallpaper 2580 with a different image, the terminal 100 can obtain an input for selecting the fourth icon 2594. The terminal 100 can display an image identical to the second image 2582 displayed at the bottom at the top of the first collage wallpaper 2580 according to an input for selecting the fourth icon 2594 and can display the second icon 2595 for changing the second image 2582 displayed at the top. As mentioned in the foregoing description, when an image of the first collage wallpaper 2580 on which the second image 2582 is displayed is changed, the terminal 100 can change the image to make the second image 2582 to be displayed at the end among selected images. In particular, when an image displayed on a collage wallpaper to which a layout for displaying a plurality of images is applied is changed, the terminal 100 can change the image in an order of not displaying the same image at the same time.

The terminal 100 according to various embodiments can obtain an input for editing a generated collage wallpaper and a generated collage wallpaper set and can edit the collage wallpaper and the collage wallpaper set according to the obtained input. Regarding this, it is explained with reference to FIGS. 26 to 29 in the following.

Figure 26:
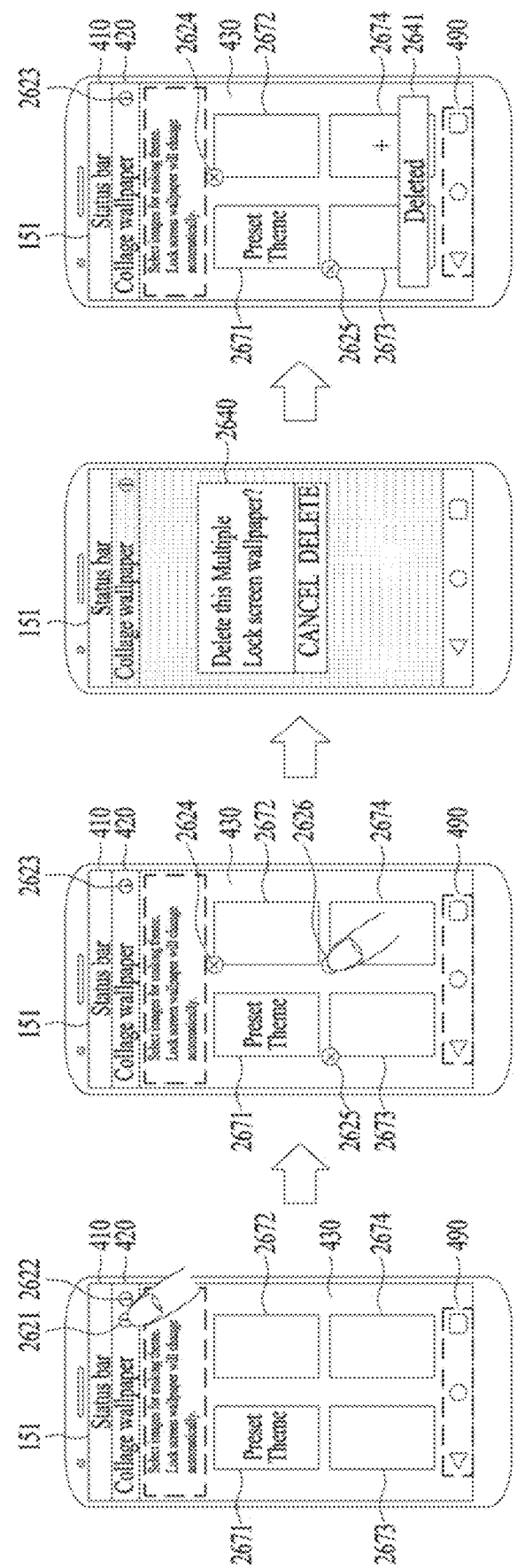
FIG. 26 is a diagram for an editing screen of a collage wallpaper set according to various embodiments of the present invention.

FIG. 26 is a diagram for an editing screen of a collage wallpaper set according to various embodiments of the present invention.

Referring to FIG. 26, the terminal 100 can display a plurality of collage wallpaper sets on the display unit 151. For example, the controller 180 displays a title for a collage wallpaper on a title area 420 and can display a plurality of theme images 2671/2672/2673/2674 corresponding to a plurality of wallpaper sets on a main area 430. The theme image 2671/2672/2673/2674 may correspond to a representative collage wallpaper included in a corresponding collage wallpaper set or an image edited from a plurality of collage wallpapers included in the collage wallpaper set. The controller 180 can display icons 2621/2622 related to the collage wallpaper on the title area 420. For example, the controller 180 can display an icon related to change, delete, and stage move of the collage wallpaper set. As an embodiment, the controller 180 can display a first icon 2621 for deleting the collage wallpaper set. If an input for selecting the first icon 2621 is obtained, the controller 180 can display an editing screen for deleting the collage wallpaper set. For example, the controller 180 can display a deletion icon 2624/2625/2626 on each of a plurality of theme images corresponding to a plurality of the collage wallpaper sets. The controller 180 may not display a deletion icon on a default theme image 2671. If an input for selecting one of the displayed deletion icons 2624/2625/2626 is obtained, the controller 180 can delete a collage wallpaper set corresponding to the selected icon. For example, if an input for selecting the fourth deletion icon 2626 is obtained, the controller 180 can delete a collage wallpaper set corresponding to the fourth theme image 2674 that corresponds to the fourth deletion icon 2626. The controller 180 displays a pop-up window 2640 before the collage wallpaper set corresponding to the selected fourth deletion icon 2626 is deleted to check whether or not the collage wallpaper set is deleted. And, the controller 180 can provide a procedure of obtaining a confirmation input. The controller 180 deletes the fourth theme image 2674 corresponding to the deleted collage wallpaper set and displays an information window 2641 to indicate that the fourth theme image 2674 is deleted. The controller 180 can display an add menu capable of generating a new collage wallpaper at a position from which the fourth theme image 2674 is deleted.

FIG. 27 is a diagram for an editing screen of a collage wallpaper according to various embodiments of the present invention.

Referring to FIG. 27, the terminal 100 can display a plurality of collage wallpapers 2771/2772/2773/2774. In this case, a plurality of the collage wallpapers 2771/2772/2773/2774 can be included in the same collage wallpaper set. The terminal 100 can display an icon 2721 related to edit of the collage wallpapers 2771/2772/2773/2774 on the title area 420. For example, the terminal 100 can display an icon 2721 for deleting the displayed collage wallpapers 2771/2772/2773/2774. If an input for selecting the icon 2721 is obtained, the terminal 100 can display a deletion icon 2781/2782/2783/2784 on each of a plurality of the displayed collage wallpapers 2771/2772/2773/2774. If an input for selecting one of the displayed deletion icons 2781/2782/2783/2784 is obtained, the terminal 100 can delete a collage wallpaper corresponding to the selected icon. For example, if an input for selecting a second deletion icon 2782 is obtained, the terminal 100 can delete a second collage wallpaper corresponding to the selected second deletion icon 2782.

When an input for deleting a collage wallpaper or a collage wallpaper set is obtained, the terminal 100 may request for an input for confirming whether or not a selected collage wallpaper or a collage wallpaper set is deleted according to a condition. If the confirmation is inputted, the terminal can delete the selected collage wallpaper or the collage wallpaper set.

Figure 28:
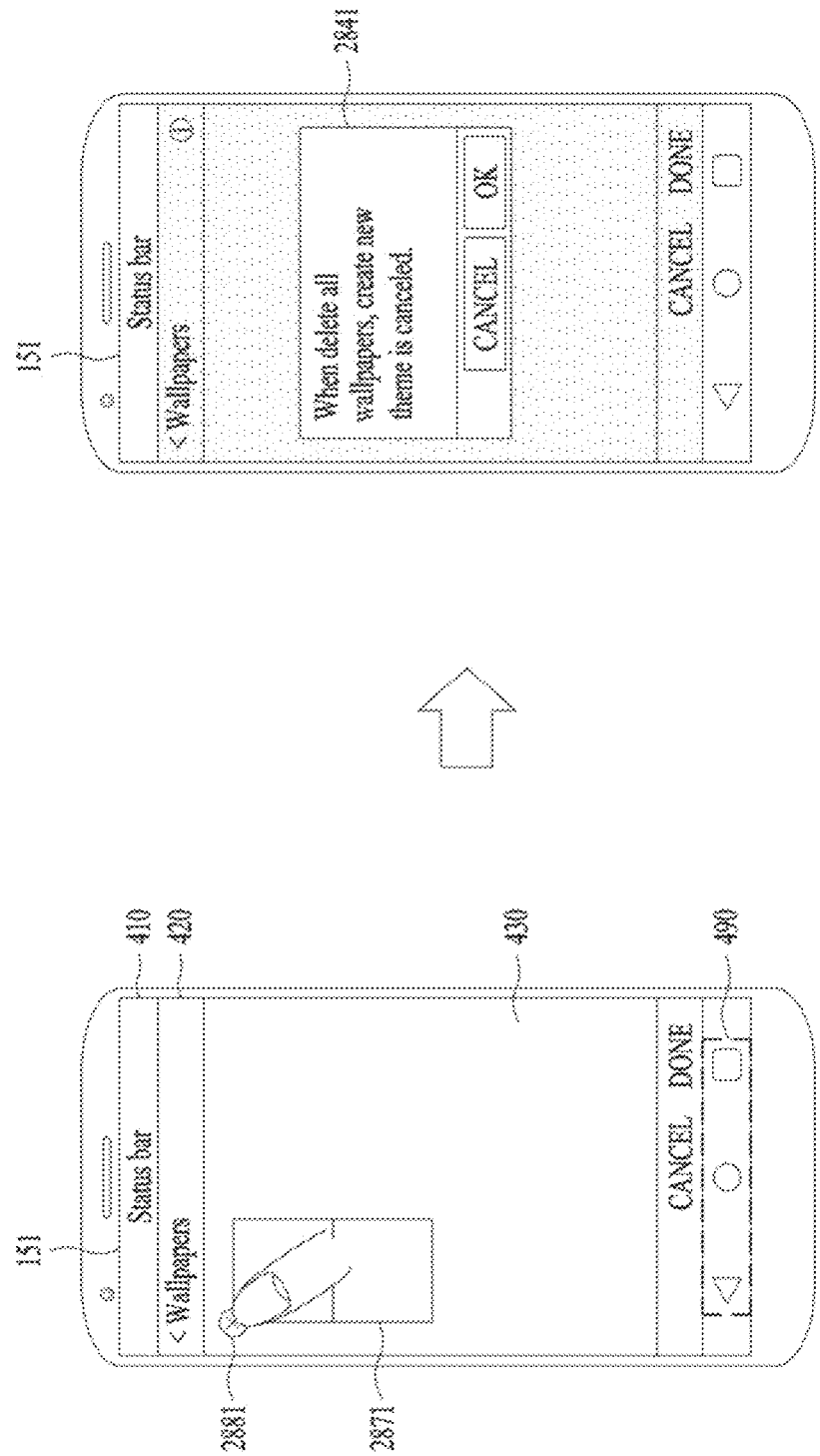

FIGS. 28 to 29 are diagrams for a delete confirmation message according to various embodiments of the present invention.

Referring to FIG. 28, the terminal 100 can display a first collage wallpaper 2871 in a procedure of generating a collage wallpaper and obtain an input for selecting a first icon 2881 for deleting the first collage wallpaper 2871. If the first collage wallpaper 2871 corresponding to the selected first icon 2881 corresponds to only collage wallpaper of the collage wallpaper generation procedure, the terminal 100 can display a deletion confirmation message 2841. For example, the terminal 100 can display a message on the deletion confirmation message 2841 to indicate that all collage wallpapers of a corresponding theme (e.g., collage wallpaper set) are deleted and the collage wallpaper generation procedure is cancelled when the first collage wallpaper 2871 is deleted. If a confirmation input for the deletion confirmation message 2841 is obtained, the terminal 100 deletes the selected first collage wallpaper 2871 and can cancel the collage wallpaper generation procedure.

Referring to FIG. 29, the terminal 100 can display the first collage wallpaper 2871 in a state that one theme (collage wallpaper set) is selected and can obtain an input for selecting the first icon 2881 to delete the first collage wallpaper 2871. If the first collage wallpaper 2871 corresponding to the selected first icon 2881 is the only collage wallpaper of a selected theme (collage wallpaper set), the terminal 100 can display a deletion confirmation message 2942. For example, the terminal 100 can display a message on the deletion confirmation message 2942 to indicate that all collage wallpapers of a corresponding theme (e.g., collage wallpaper set) are deleted and the theme is cancelled when the first collage wallpaper 2871 is deleted. If a confirmation input for the deletion confirmation message 2942 is obtained, the terminal 100 can delete the selected first collage wallpaper 2871 and a collage wallpaper set including the selected first collage wallpaper 2871.

When a lock is released, the terminal 100 according to various embodiments can provide a lock release effect that areas of a lock screen are opened in a different direction. For example, if an input inputted on a lock screen is obtained, the terminal 100 can provide an effect that the divided areas of the lock screen move in different direction in response to the direction of the obtained input. If a collage wallpaper is displayed as a lock screen, the terminal 100 can provide an effect that divided areas of the collage wallpaper move in different direction according to a lock release input. And, the terminal 100 can also provide an effect that layers displayed on the lock screen move is different direction. Regarding this, it is explained with reference to FIG. 30 in the following.

Figure 30:
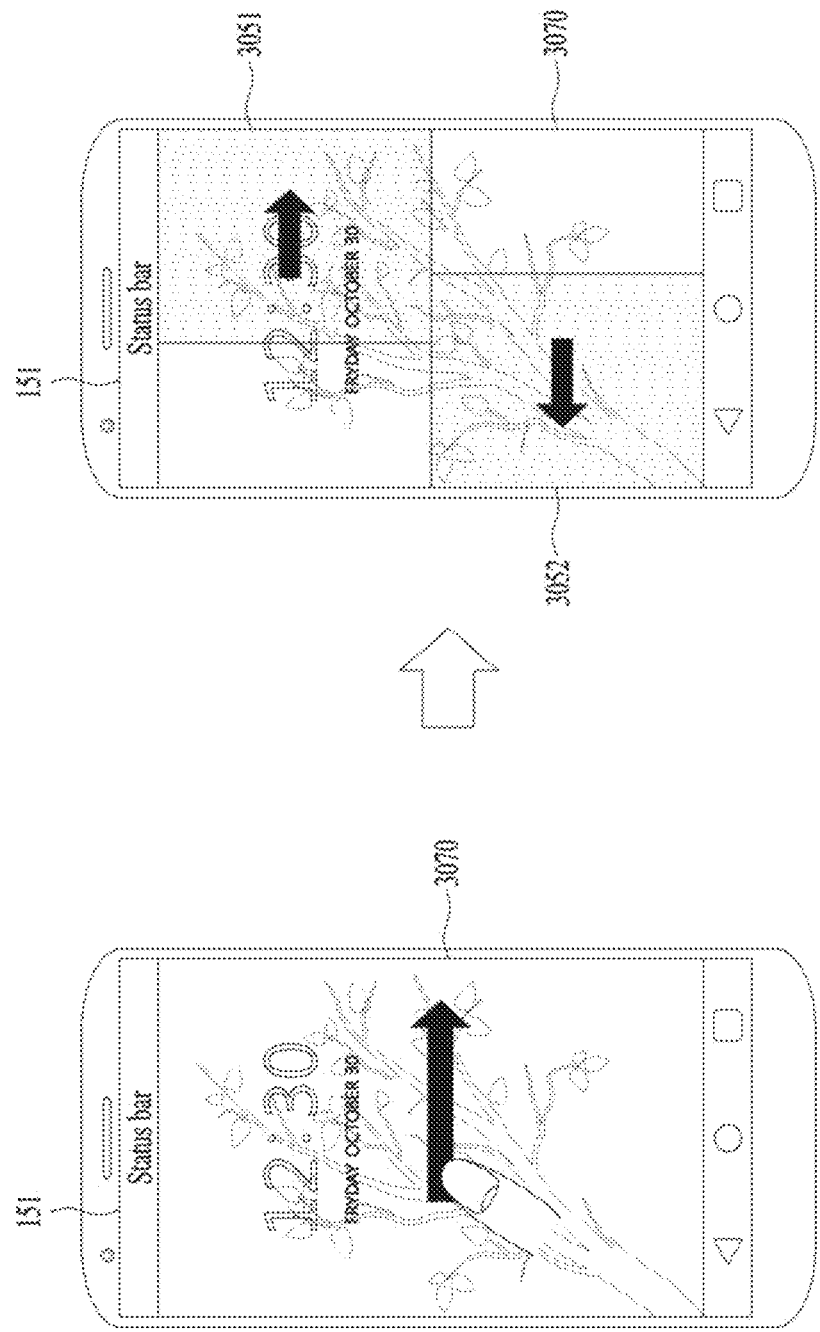
FIG. 30 is a diagram for an example of a lock release effect according to various embodiments of the present invention.

FIG. 30 is a diagram for an example of a lock release effect according to various embodiments of the present invention.

Referring to FIG. 30, the terminal 100 can display a lock screen 3070 on the display unit 151. In this case, the lock screen may correspond to a collage wallpaper. The terminal 100 can obtain an input for releasing a lock. For example, the terminal 100 can obtain a swiping input in one direction as an input for releasing a lock. The terminal 100 can provide a lock release effect in response to the inputted lock release input. For example, the terminal 100 can provide an effect of opening an upper area 3051 and a lower area 3052 on the basis of a position at which the lock release input is inputted. Specifically, the terminal can provide 100 an effect that the upper area 3051 is moved to the right and the lower area 3052 is moved to the left according to the swipe input. The terminal 100 can also provide an effect that an upper area 3051 and a lower area 3052 of a layer displayed on a lock screen 3070 are moved to the right and the left, respectively. In this case, the layer displayed on the lock screen 3070 can be blurred. And, if all or a part of a collage wallpaper, which is displayed as a lock screen, corresponds to a moving image, the terminal 100 can display a collage wallpaper including the moving image when a lock release effect is provided according to a lock release input. The terminal 100 can display a collage wallpaper including a moving image, which is moving in normal direction or reverse direction according to a direction of an input. For example, if an input of a first direction is obtained, the terminal 100 can configure a moving image included in a collage wallpaper to move in normal direction. If an input of a second direction is obtained, the terminal 100 can configure the moving image included in the collage wallpaper to move in reverse direction. Meanwhile, if a lock release input is not sufficient enough for releasing a lock, a provided effect can be turned back. For example, the terminal 100 can configure a layer, which is moving in first direction according to a lock release input, to move in second direction corresponding to a reverse direction. In particular, the terminal 100 can configure the moving layer to return to a lock position. And, the terminal 100 can configure a moving image, which is moving in normal direction according to a lock release input, to move in reverse direction. In particular, the terminal 100 can provide various effects related to lock release.

When a collage wallpaper is displayed, if the terminal 100 according to various embodiments senses occurrence of an event, the terminal can display information on the occurred event on the displayed collage wallpaper. If a plurality of events are sensed, in order to display a plurality of event information, the terminal 100 can extend a color area of the collage wallpaper and display a plurality of the event information on the extended color area. And, if the terminal 100 obtains an input inputted on the color area on which event information is displayed, the terminal may execute an application corresponding to the displayed event information. Regarding this, it is explained with reference to FIGS. 31 to 37 in the following.

Figure 31:
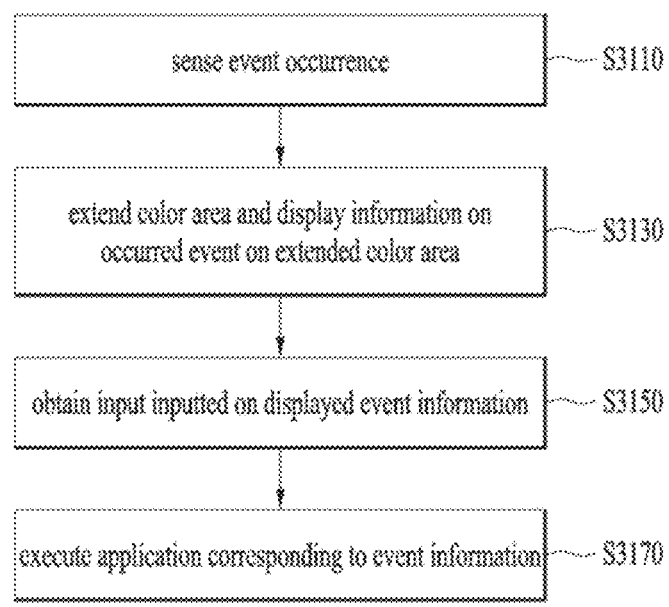
FIG. 31 is a flowchart for an operation of displaying event information according to various embodiments of the present invention.

FIG. 31 is a flowchart for an operation of displaying event information according to various embodiments of the present invention.

Referring to FIG. 31, the terminal 100 can sense occurrence of an event [S3110]. The controller 180 of the terminal 100 can sense occurrence of at least one event. In this case, examples of the sensed event can include message reception, call signal reception, unanswered call, alarm, schedule notification, email reception, information reception via application, and the like.

As an embodiment, the terminal 100 can sense occurrence of an event in a state that a collage wallpaper is configured as a wallpaper. Specifically, the terminal 100 may display a collage wallpaper on the display unit 151 or the terminal may be in a lock status. The lock status may correspond to a status that the display unit 151 is turned on or turned off.

The terminal 100 extends a color area included in the collage wallpaper and may be able to display information on the occurred event on the extended color area [3130].

The terminal 100 can display the information on the occurred event on the color area of the collage wallpaper. In order for the terminal 100 to display the information on the occurred event on the color area of the collage wallpaper, the terminal 100 may extend the color area of the collage wallpaper. For example, if a size of an area on which the information on the occurred event is to be displayed corresponds to a size capable of being displayed on the color area of the collage wallpaper, the terminal can display the event information on the color area without extending the color area of the collage wallpaper. If the size of the area on which the information on the occurred event is to be displayed is greater than the size capable of being displayed on the color area of the collage wallpaper, the terminal extends the color area of the collage wallpaper and may be then able to display the event information on the extended color area. Regarding this, it is explained with reference to FIGS. 32 to 34 in the following.

Figure 32:
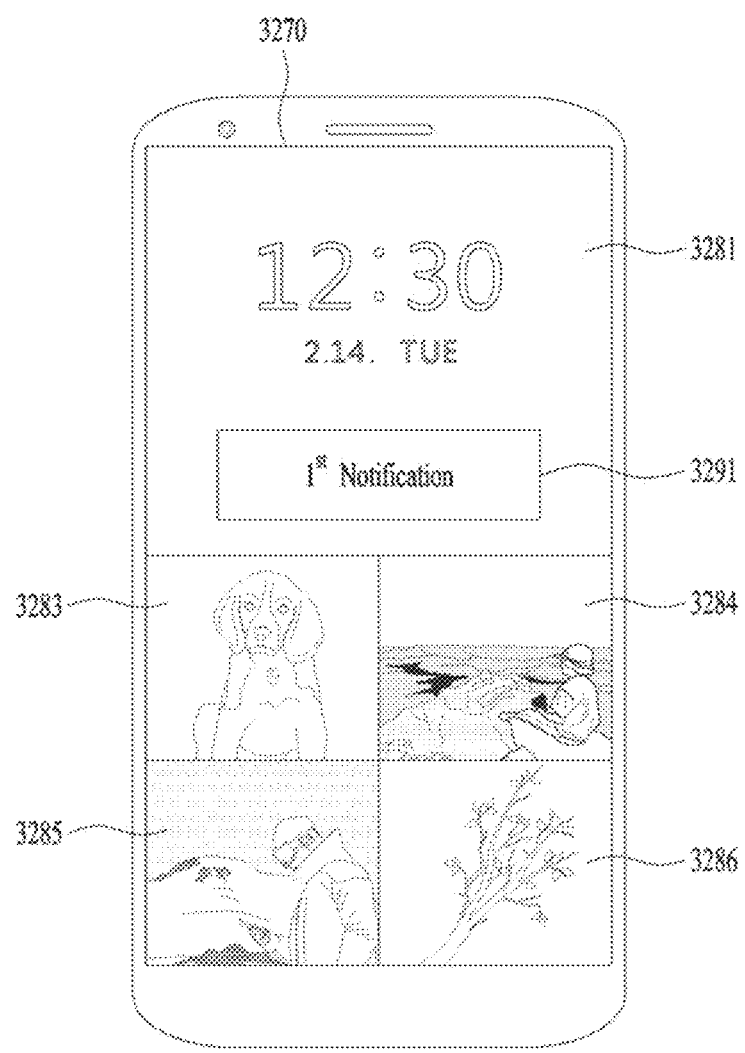
FIGS. 32 to 34 are diagrams for an example of displaying event information according to various embodiments of the present invention.
Figure 33:
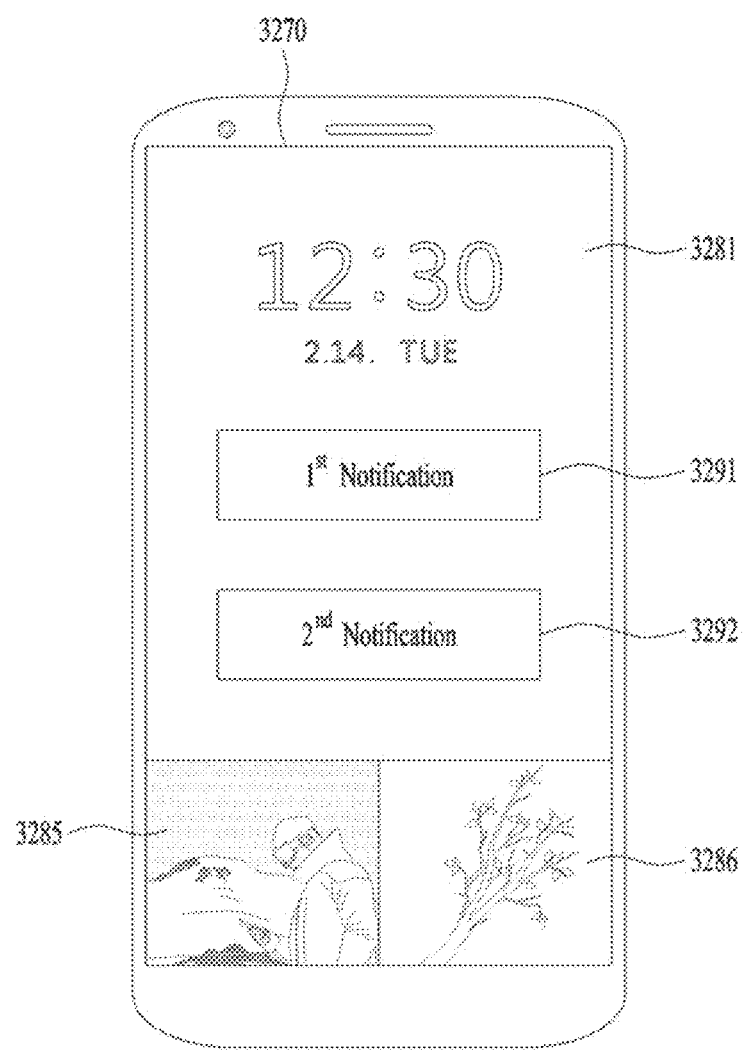
Figure 34:
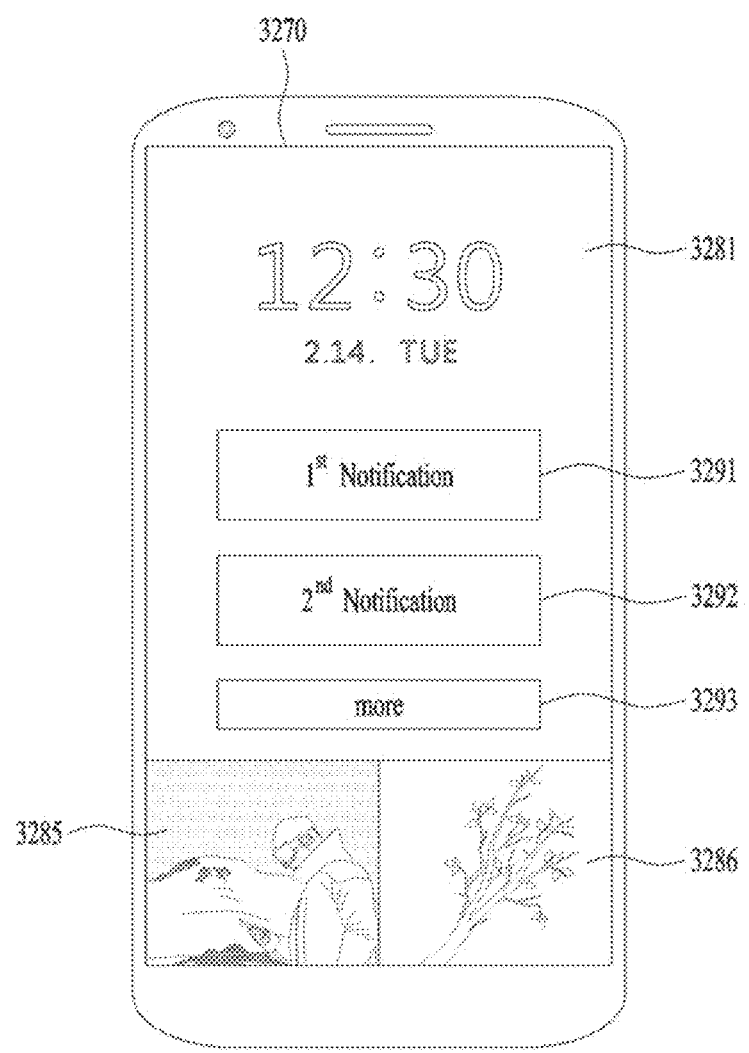

FIGS. 32 to 34 are diagrams for an example of displaying event information according to various embodiments of the present invention.

Referring to FIG. 32, the terminal 100 can sense a first event. The terminal 100 can display a collage wallpaper 3270 on the display unit 151. The collage wallpaper generated by the terminal 100 can include a color area 3281 and image areas 3283/3284/3285/3286. A plurality of images can be included in the image areas 3283/3284/3285/3286. As an embodiment, the terminal 100 can display the color area 3281 displaying a first color on an upper part of the terminal and display the image areas 3283/3284/3285/3286 displaying a first to fourth image on a lower part of the terminal. The controller 180 can display information on the sensed first event on the color area 3281. For example, the controller 180 can display a first event notification window 3291 on the color area 3281. In particular, the terminal 100 can display event information on an occurred event on a color area of a collage wallpaper.

Referring to FIG. 33, the terminal 100 can sense a first event and a second event. The terminal 100 can display a collage wallpaper 3270 on the display unit 151. If a size of an area on which the occurred event is to be displayed is greater than a size of the color area 3281, the controller 180 of the terminal 100 can extend the color area 3281. For example, the controller 180 can extend the color area 3281 to a partial area 3283/3284 of image areas corresponding to a first image and a second image. In particular, the terminal 100 can display a collage wallpaper 3270 including the extended color area 3281 and the reduced image areas 3285/3286. The controller 180 can display a first event notification window 3291 and a second event notification window 3292 on the extended color area 3281. In particular, in order for the terminal to display event information on an occurred event, the terminal 100 can extend the color area of the collage wallpaper and display the event information on the extended color area.

Referring to FIG. 34, the terminal 100 can sense a first event, a second event, and third event. The terminal 100 can display a collage wallpaper 3270 on the display unit 151. If a size of an area on which the occurred event is to be displayed is greater than a size of the color area 3281, the controller 180 of the terminal 100 can extend the color area 3281. For example, the controller 180 can extend the color area 3281 to a partial area 3283/3284 of image areas corresponding to a first image and a second image. In particular, the terminal 100 can display a collage wallpaper 3270 including the extended color area 3281 and the reduced image areas 3285/3286. The controller 180 can display a first event notification window 3291, a second event notification window 3292, and an add display window 3283 on the extended color area 3281. In this case, the add display window 3283 may correspond to a user interface for further displaying an event notification window for an event not displayed by the event notification window 3291/3282. If an input for selecting the add display window 3283 is obtained, the controller 180 can display an event notification window for a third event, which is not displayed by the event notification window. In particular, in order for the terminal to display event information on an occurred event, the terminal 100 can extend the color area of the collage wallpaper and display the event information on the extended color area. If occurrence of events equal to or greater than a prescribed number is sensed, the terminal 100 displays event information on a part of the occurred events only and may be able to display a user interface capable of displaying the remaining events. If an input for selecting the user interface, which is capable of displaying event information not displayed on the color area, is obtained, the terminal 100 can further display event information not displayed. In particular, the terminal 100 can provide event information on a sensed event to a user while maintaining a size of the color area with a prescribed size in the collage wallpaper.

The terminal 100 according to various embodiments can adjust at least one selected from the group consisting of the number of images displayed on a collage wallpaper, a layout, and a size of an image area according to the number of events sensed by the terminal. Regarding this, it is explained with reference to FIG. 35 in the following.

Figure 35:
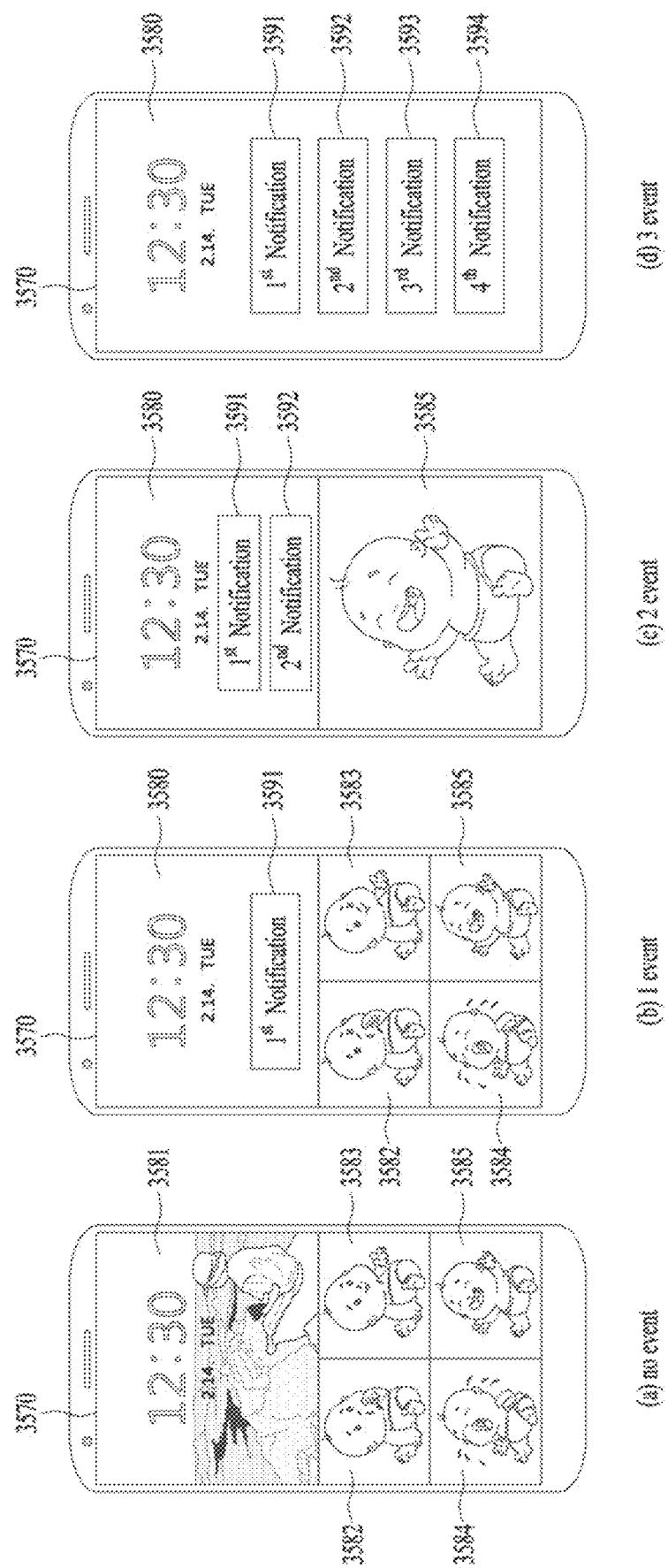
FIG. 35 is a diagram for an example of adjusting a collage wallpaper according to various embodiments of the present invention.

FIG. 35 is a diagram for an example of adjusting a collage wallpaper according to various embodiments of the present invention.

Referring to FIG. 35 (a), the terminal 100 can generate a collage wallpaper 3570 including a plurality of images in a plurality of areas and display the collage wallpaper on the display unit 151. For example, the terminal 100 displays an image 3581 on an upper area of the terminal, divides a lower area into four areas, and displays a different image 3582/3583/3584/3585 on each of the four areas. When the terminal 100 displays the collage wallpaper 3670, the terminal may be in a state that no event occurs.

Referring to FIG. 35 (b), the terminal 100 can sense occurrence of a first event. The terminal 100 can display information on the sensed first event occurrence on the upper area of the collage wallpaper 3570. In this case, the upper area may correspond to a color area 3580 on which a single color is displayed or an area on which a first image 3581 used to be displayed. The terminal can display the color displayed on the color area 3580 with a color corresponding to the sensed first event. In this case, the color corresponding to the sensed first event may correspond to a color indicating an application corresponding to the first event or a color corresponding to a type of the first event. The terminal 100 can display a first event notification window 3591 for the first event on the color area 3580. In particular, the terminal 100 can switch a partial area of a collage wallpaper to a color area to display information on an occurred event.

Referring to FIG. 35 (c), the terminal 100 can sense a first event occurrence and a second event occurrence. The terminal 100 can display information on the first event occurrence and the second event occurrence on the upper area 3580 of the collage wallpaper 3570. In this case, the upper area may correspond to a color area 3580 on which a single color is displayed or an area on which the first image 3581 used to be displayed. The terminal 100 can display the color displayed on the color area 3580 with a color corresponding to the sensed first event or the second event. Or, the terminal 100 can display the color displayed on the color area 3580 with a mixed color of a plurality of colors respectively corresponding to the first event and the second event. In this case, the color corresponding to the first event may correspond to a color indicating an application corresponding to the first event or a color corresponding to a type of the first event. And, the color corresponding to the second event may correspond to a color indicating an application corresponding to the second event or a color corresponding to a type of the second event. Among a plurality of applications corresponding to a plurality of events, if a user more uses an application in terms of time of using the application or count of using the application, the terminal 100 can display a color corresponding to the application on the color area 3580. When the information on a plurality of the events is displayed on the color area 3580 positioned at the upper part of the collage wallpaper, the terminal 100 can adjust the number of images displayed on the image area positioned at the lower part of the collage wallpaper. For example, in order to enhance visibility of a plurality of event notification windows 3591/3592 displayed on the color area, the terminal can display a single image only on the image area positioned at the lower part of the collage wallpaper. For example, the terminal 100 can display a fifth image 3585 only on the image area by removing a second image to fourth image 3582/3583/3584 from the second image to a fifth image 3582/3583/3584/3585 used to be displayed on the image area positioned at the lower part of the collage wallpaper. The terminal 100 can display a first event notification window 3591 for the occurred first event and a second event notification window 3592 for the occurred second event on the color area 3580. In particular, the terminal can switch a partial area of a collage wallpaper into a color area to display information on a plurality of occurred events and adjust at least one of the number of images displayed on an image area and a layout.

Referring to FIG. 35 (*d*), the terminal 100 can sense first event occurrence, second event occurrence, third event occurrence, and fourth event occurrence. The terminal 100 can display the entire area of a collage wallpaper as a color area 3580 to display information on a plurality of the sensed event occurrences. The terminal 100 can display the information on a plurality of the sensed event occurrences on the color area 3580. For example, the controller 180 of the terminal 100 can display a first event notification window 3591 for the first event, a second event notification window 3592 for the second event, a third event notification window 3593 for the third event, and a fourth event notification window 3594 for the fourth event on the color area 3580.

If an input is inputted on a color area on which event information is displayed, the terminal 100 according to various embodiments can execute or activate an application corresponding to the event information. Regarding this, it is explained with reference to FIGS. 36 to 37 in the following.

Figure 36:
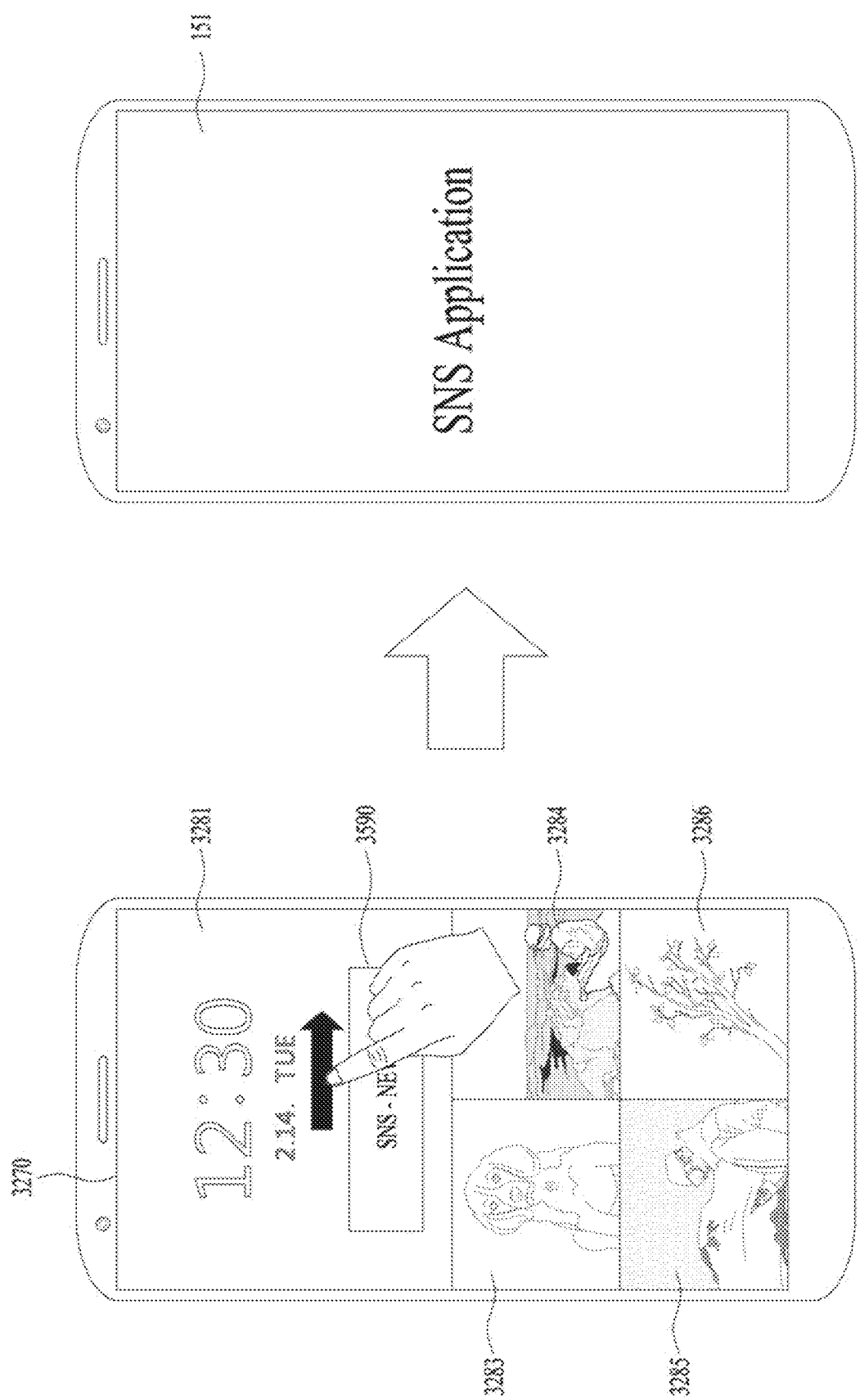
FIG. 36 is a diagram for an example of executing an SNS application according to various embodiments of the present invention.

FIG. 36 is a diagram for an example of executing an SNS application according to various embodiments of the present invention.

Referring to FIG. 36, the terminal 100 can display a collage wallpaper 3270 on the display unit 151. For example, the terminal 100 displays a color area 3281 on an upper part of the collage wallpaper 3270 and can display image areas 3283/3284/3285/3286 displaying a plurality of images on a lower part of the collage wallpaper. The terminal 100 can sense an occurred event. For example, the controller 180 of the terminal 100 can sense a new posting of an SNS (social network service). The controller 180 can display an event notification window 3590 for the new posting corresponding to the sensed event on the color area 3281. In this case, the new posting event may correspond to an event related to an SNS application. The controller 180 can display the color area 3281 with a color corresponding to the SNS application. For example, the controller 180 can display the color area 3281 with a first color representing the SNS application. If an input inputted on the color area 3281 is obtained, the terminal 100 can execute or activate the SNS application. The controller 180 can display an SNS application screen on the display unit 151. As a specific embodiment, the controller 180 can obtain an input of swiping a point of the color area 3281 and execute or activate the SNS application. The controller 180 can display an SNS application screen on the display unit 151. As a different embodiment, the controller 180 can obtain an input of swiping a point of the color area in a lock state, release the lock state, and execute or activate the SNS application. The controller can display the SNS application screen on the display unit 151. The aforementioned explanation on executing or activating the SNS application according to the input inputted on the color area of the terminal 100 is just an example only. Hence, an application corresponding to an event notification window can be executed or activated according to various inputs inputted on the color area on which the event notification window is displayed as well as the aforementioned swipe input. For example, it may be able to apply various types of touch including a short touch, a long touch, multi touch, a drag touch, a flick touch, a pinch-in touch, a pinch-out touch, a hovering touch, a force touch, and the like to the color area as well as the swipe input. Meanwhile, if an input inputted on the event notification window is obtained, the controller 180 can execute or activate an application corresponding to the event notification window. For example, if an input inputted on an event notification window 3590 displayed on the color area 3281 is obtained, the controller 180 can execute or activate an SNS application.

Figure 37:
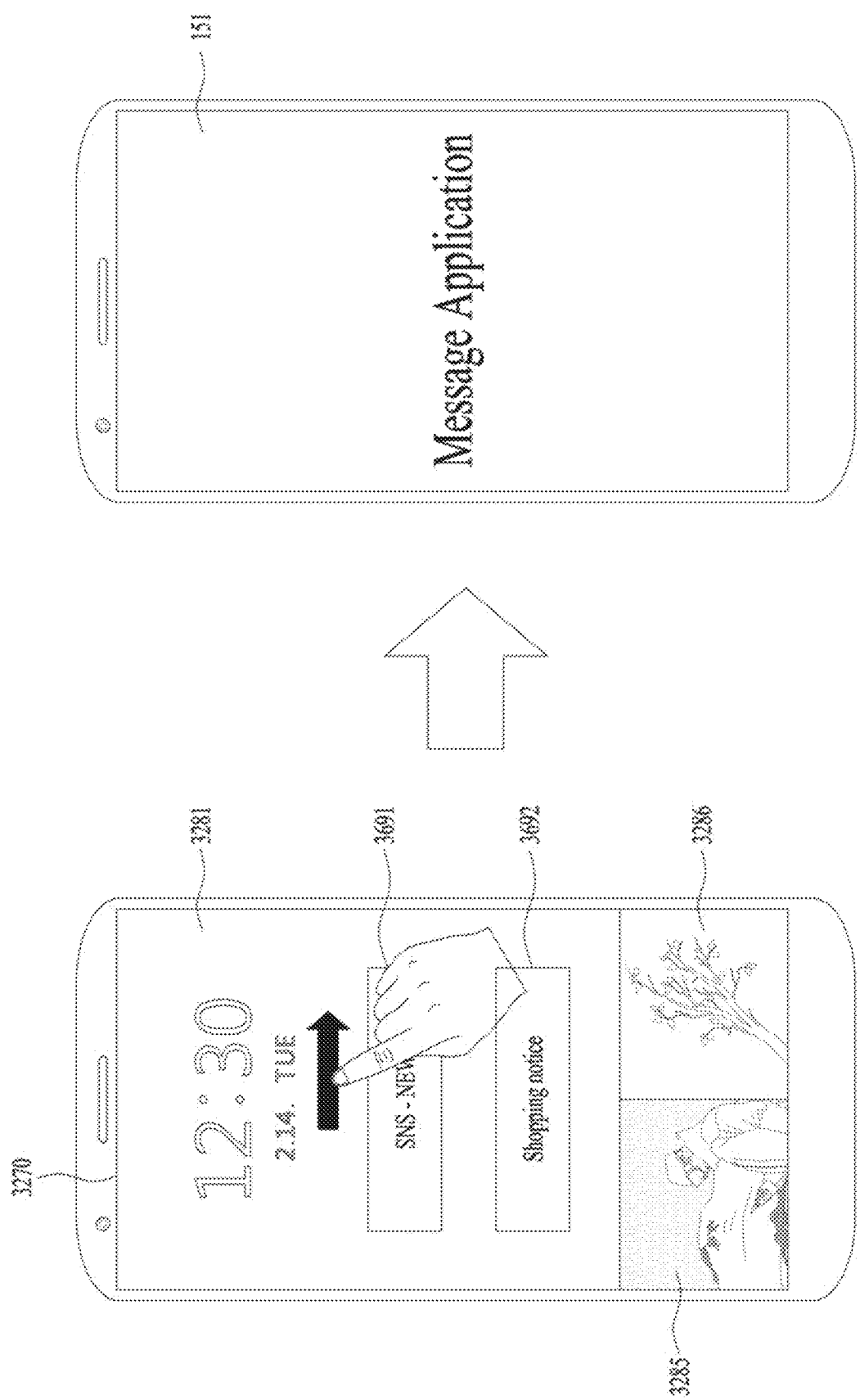
FIG. 37 is a diagram for an example of executing a message application according to various embodiments of the present invention.

FIG. 37 is a diagram for an example of executing a message application according to various embodiments of the present invention.

Referring to FIG. 37, the terminal 100 can sense an occurred event. For example, the controller 180 of the terminal 100 can sense reception of a new message and registration of a shopping notice. In this case, the reception of the new message corresponds to an event related to a message application and the registration of the shopping notice may correspond to an event related to a shopping application. The controller 180 can display a plurality of event notification windows 3691/3692 on the color area 3281 in response to the reception of the new message and the registration of the shopping notice. Specifically, in order to display a plurality of the event notification windows 3691/3692 on the color area 3281, the terminal 100 can extend the color area 3281 and reduce the image areas 3285/3286 of the collage wallpaper 3270. The terminal 100 can display a message reception event notification window 3691 and a shopping notice event notification window 3692 on the color area 3281 in response to the reception of the new message and the registration of the shopping notice, respectively. The controller 180 can display the color area 3281 with a color corresponding to a message application or a shopping application. For example, the controller 180 can display the color area 3281 with a color corresponding to an application more frequently used by a user among the message application and the shopping application. As an embodiment, the controller 180 can display the color area 3281 with a second color corresponding to the message application more frequently used by a user. If an input inputted on the color area 3281 is obtained, the terminal 100 can execute or activate an application corresponding to a color displayed on the color area 3281. For example, the controller 180 can obtain an input of swiping a point of the color area 3281 and execute or activate the message application. The controller 180 can display a message application screen on the display unit 151. As a different embodiment, the controller 180 can obtain an input of swiping a point of the color area 3281 in a lock state, release the lock state, and execute or activate the message application. The controller 180 can display a message application screen on the display unit 151. If an input inputted on the color area on which an event notification window is displayed is obtained, the terminal 100 can execute or activate an application corresponding to the event notification window. Since the operation of executing or activating the application is mentioned above, detail explanation is omitted at this time.

As mentioned in the foregoing description, the terminal 100 according to various embodiments can obtain an input for setting a position of a color area included in a collage wallpaper and change the position of the color area included in the collage wallpaper according to the setting. Regarding this, it is explained with reference to FIG. 38 in the following.

Figure 38:
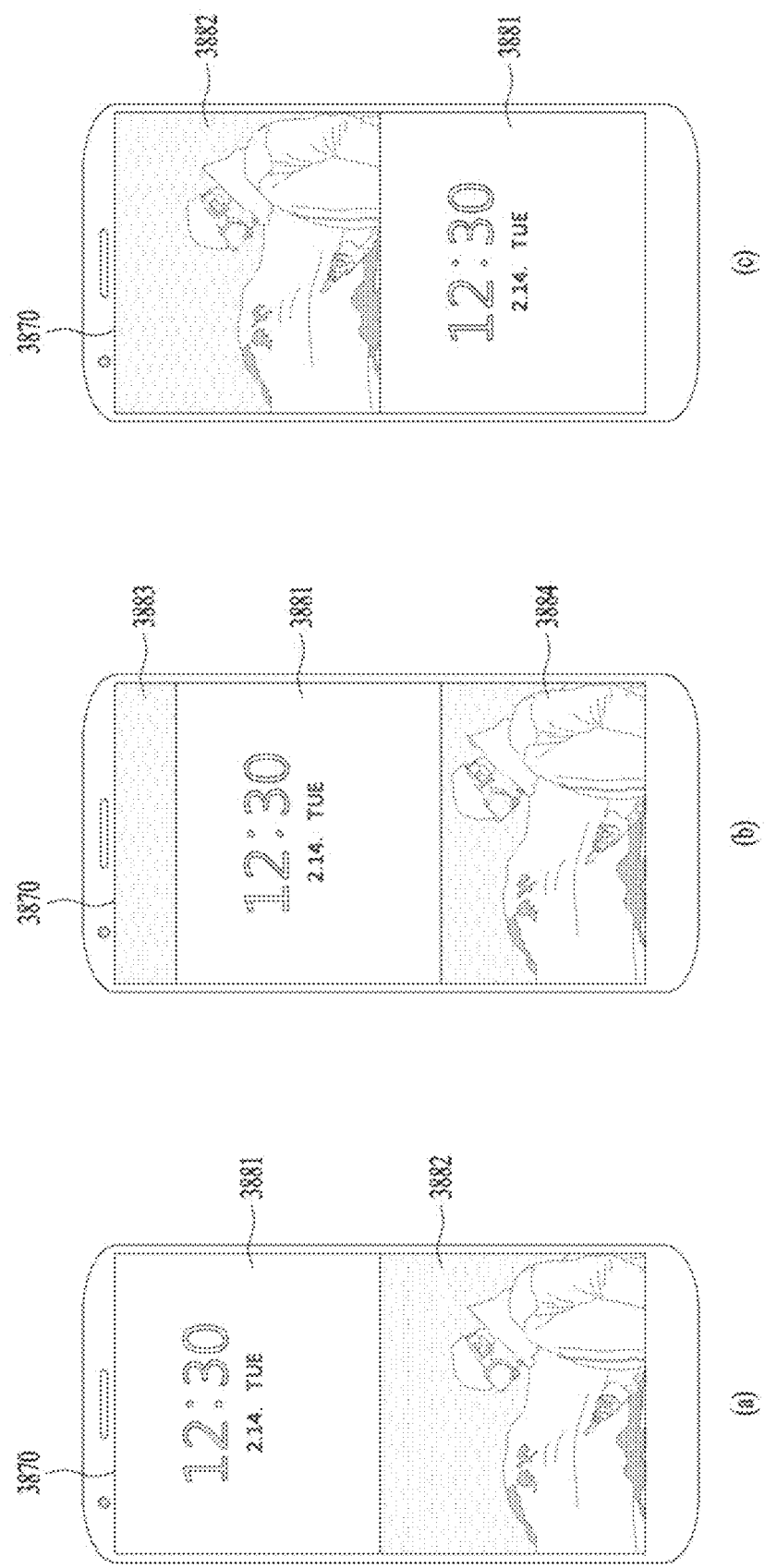
FIG. 38 is a diagram for an example of setting a color area position according to various embodiments of the present invention.

FIG. 38 is a diagram for an example of setting a color area position according to various embodiments of the present invention.

Referring to FIG. 38 (a), the terminal 100 can display a color area 3881 on an upper part of a collage wallpaper 3870 and display an image area 3882 on a lower part of the collage wallpaper. Referring to FIG. 38 (b), the terminal 100 displays a first image area 3883 on an upper part of the collage wallpaper 3870, displays a color area 3881 on a middle part of the collage wallpaper, and displays a second image area 3884 on a lower part of the collage wallpaper. In this case, images displayed on the first image area 3883 and the second image area 3884 may correspond to a partial area and the remaining area of a single image or a different image. Referring to FIG. 38 (c), the terminal 100 can display an image area 3882 on an upper part of a collage wallpaper 3870 and display a color area 3881 on a lower part of the collage wallpaper. In particular, the terminal 100 can display the color area 3881 in various positions in the collage wallpaper 3870.

The terminal 100 according to various embodiments can display various information and menus on the color area of the collage wallpaper. For example, the terminal 100 can display time and date on the color area of the collage wallpaper and display a notification on an occurred event. The terminal 100 can display various menus (e.g., quick setting menu) on the color area. Regarding this, it is explained with reference to FIGS. 39 to 40 in the following.

Figure 39:
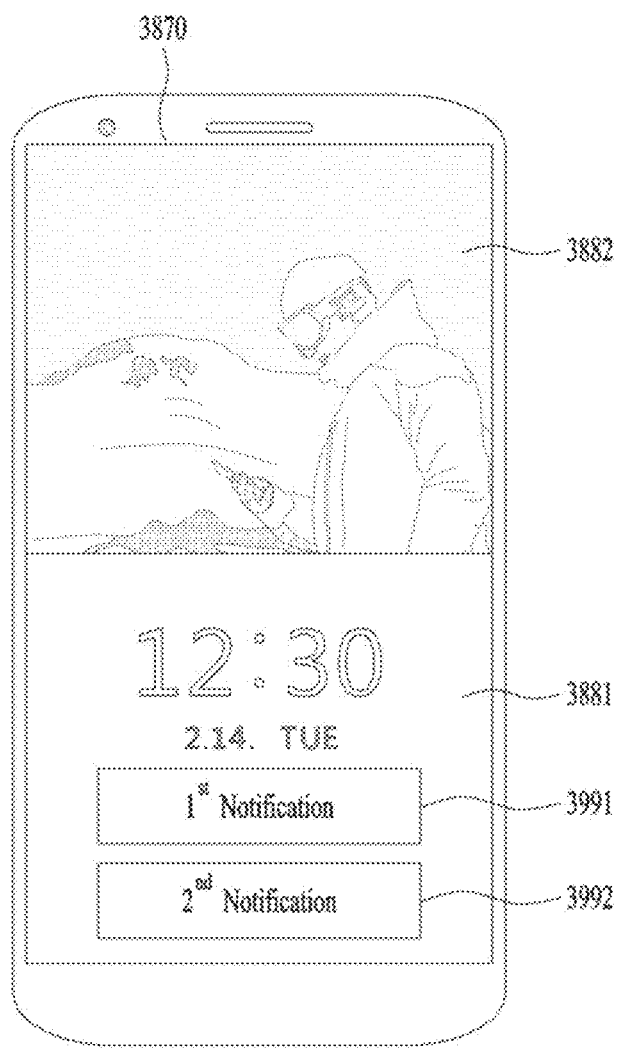
FIG. 39 is a diagram for an example of notifying an event according to various embodiments of the present invention.

FIG. 39 is a diagram for an example of notifying an event according to various embodiments of the present invention.

Referring to FIG. 39, the controller 180 of the terminal 100 can display a notification according to an occurred event on the color area 3881. For example, the controller 180 can display a first notification 3991 and a second notification 3992 according to an occurred event on the color area 3881 of the collage wallpaper 3870. Specifically, the controller 180 can sequentially display the first notification 3991 and the second notification 3992 from the bottommost of the collage wallpaper 3870 in up direction. As a different example, if the color area 3881 is positioned at an upper part of the collage wallpaper 3870, the controller 180 can display the first notification 3991 and the second notification 3992 from the topmost of the collage wallpaper 3870 in down direction. In particular, the terminal 100 can display a notification according to an occurred event on the color area 3881 of the collage wallpaper 3870.

Figure 40:
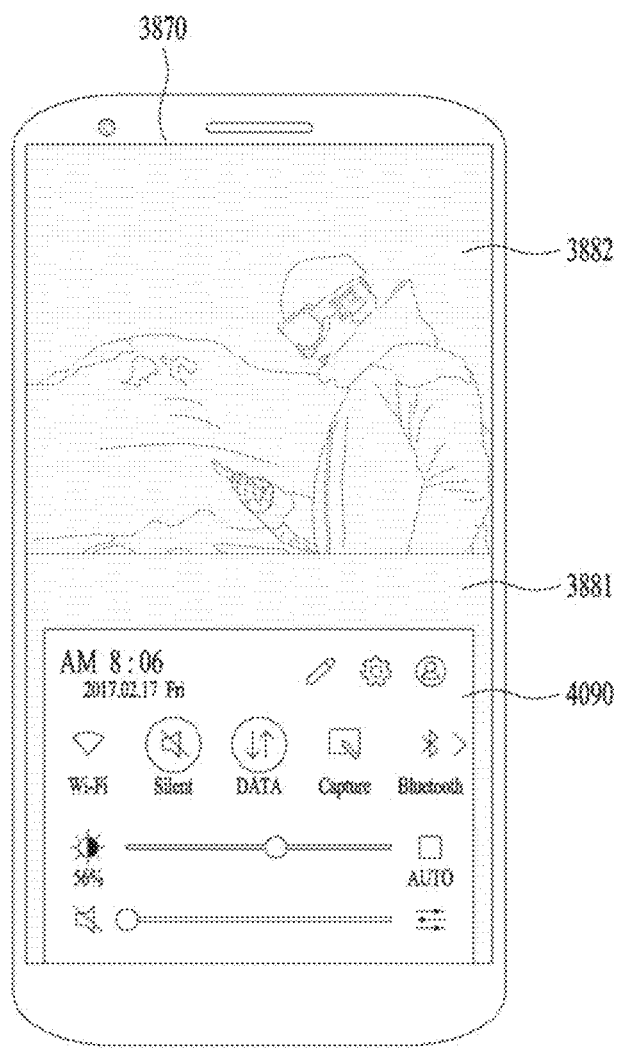
FIG. 40 is a diagram for an example of displaying a quick setting menu according to various embodiments of the present invention.

FIG. 40 is a diagram for an example of displaying a quick setting menu according to various embodiments of the present invention.

Referring to FIG. 40, the controller 180 of the terminal 100 can display a quick setting menu 4090 for a setting related to an operation of the terminal on the color area 3881 of the collage wallpaper 3870. For example, if an input of swiping the bottommost of the collage wallpaper 3870 in up direction is obtained in a state that the collage wallpaper 3870 is displayed, the terminal 100 can display the quick setting menu 4090 on the color area 3881. As a different example, when the color area 3881 is positioned at an upper part of the collage wallpaper 3870, if an input of swiping the topmost of the collage wallpaper 3870 in down direction is obtained, the controller 180 can display the quick setting menu 4090 on the color area 3881. In particular, the terminal can display the quick setting menu 4090 for a setting related to an operation of the terminal on the color area 3881 of the collage wallpaper 3870.

Various embodiments may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The processor may include the controller 180 of the mobile terminal.

The foregoing embodiments are merely exemplary and are not to be considered as limiting the present disclosure. The present teachings can be readily applied to other types of methods and apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds, are therefore intended to be embraced by the appended claims.

What is claimed is:

1. A terminal, comprising:
 a display;
 a memory configured to store images; and
 a controller configured to:
  select a first image and a second image in response to an input, wherein the first image and the second image are two of the stored images;
  cause the display to display a screen comprising a color area and an image area, wherein the color area includes a first color that is displayed;
  cause the display to display the first image and the second image in the image area;
  generate a collage wallpaper comprising the first color at a first area and the first image and the second image at a second area, and wherein the first area is a partial portion of the collage wallpaper and the second area is a remaining portion of the collage wallpaper;
  cause the display to display the collage wallpaper; and
  cause the display to change the first color into a predetermined second color at the first area, to display event information at the first area of the second color, to have one of the first image and the second image disappear from the second area, and to have the other of the first image and the second image remain at the second area in the collage wallpaper in response to an occurrence of an event, wherein the second color is predetermined to correspond to the event.

2. The terminal of claim 1, wherein the controller is further configured to:
 cause the display to display an application screen corresponding to the event in response to an input received with regard to the displayed event information.

3. The terminal of claim 1, wherein the controller is further configured to:
 select the first color that is displayed at the color area based on which color, of a plurality of colors present in the first image, meets a portion threshold relative to other colors of the plurality of colors.

4. The terminal of claim 1, wherein the controller is further configured to:
select a plurality of images from among the stored images, in response to further input, wherein the first image and the second image are two of the plurality of images; and
generate a plurality of collage wallpapers, each having a predetermined layout, based on the selected plurality of images, wherein each collage wallpaper of the plurality of collage wallpapers includes a different arrangement of the selected plurality of images.

5. The terminal of claim 1, wherein the controller is further configured to:
determine whether or not a modification period for modifying the displayed collage wallpaper is present based on at least one of a display attribute of the displayed collage wallpaper or an operation status of the terminal; and
cause the display to display a different collage wallpaper, from among a plurality of collage wallpapers included in a collage wallpaper set, when the modification period is present.

6. The terminal of claim 5, wherein the display attribute includes at least one of display timing, display time, or display count of the displayed collage wallpaper, and wherein the operation status of the terminal includes a turn-on status of the display or a display status of the displayed collage wallpaper.

7. The terminal of claim 6, wherein the controller is further configured to:
determine whether or not the modification period for modifying the displayed collage wallpaper is present based on time elapsed from a first point at which the displayed collage wallpaper is first displayed or a second point at which the displayed collage wallpaper is last displayed in a single cycle for which the plurality of the collage wallpapers included in the collage wallpaper set are displayed.

8. The terminal of claim 5, wherein the controller is further configured to:
cause the display to display the different collage wallpaper according to an order based on a layout set of the plurality of collage wallpapers included in the collage wallpaper set.

9. The terminal of claim 1, wherein the first color of the color area is a single color.

10. The terminal of claim 1, wherein the first area corresponds to the color area and the second area corresponds to the image area.

11. The terminal of claim 1, wherein the controller is further configured to:
enlarge the other of the first image and the second image in the second area when the one of the first image and the second image disappears from the second area in response to the occurrence of the event.

12. A display method performed at a terminal having a display and memory, the method comprising:
selecting a first image and a second image in response to an input, wherein the first image and the second image are two of a plurality of images stored in the memory;
displaying, on the display, a screen comprising a color area and an image area, wherein the color area includes a first color that is displayed;
displaying, on the display, the first image and the second image in the image area;
generating a collage wallpaper comprising the first color at a first area and the first image and the second image at a second area, and wherein the first area is a partial portion of the collage wallpaper and the second area is a remaining portion of the collage wallpaper;
displaying, on the display, the collage wallpaper; and
changing the first color into a predetermined second color at the first area, displaying event information at the first area of the second color, having one of the first image and the second image disappear from the second area, and having the other of the first image and the second image remain at the second area in the collage wallpaper in response to an occurrence of an event, wherein the second color is predetermined to correspond to the event.

13. The method of claim 12, further comprising:
displaying, on the display, an application screen corresponding to the event in response to an input received with regard to the displayed event information.

14. The method of claim 12, further comprising:
selecting the first color that is displayed at the color area based on which color, of a plurality of colors present in the first image, meets a portion threshold relative to other colors of the plurality of colors.

15. The method of claim 12, further comprising:
selecting a plurality of images from among the stored images, in response to further input, wherein the first image and the second image are two of the plurality of images; and
generating a plurality of collage wallpapers, each having a predetermined layout, based on the selected plurality of images, wherein each collage wallpaper of the plurality of collage wallpapers includes a different arrangement of the selected plurality of images.

16. The method of claim 12, further comprising:
determining whether or not a modification period for modifying the displayed collage wallpaper is present based on at least one of a display attribute of the displayed collage wallpaper or an operation status of the terminal; and
displaying, on the display, a different collage wallpaper, from among a plurality of collage wallpapers included in a collage wallpaper set, when the modification period is present.

17. The method of claim 16, wherein the display attribute includes at least one of display timing, display time, or display count of the displayed collage wallpaper, and wherein the operation status of the terminal includes a turn-on status of the display or a display status of the displayed collage wallpaper.

* * * * *